(12) United States Patent
Bandy

(10) Patent No.: US 9,096,110 B1
(45) Date of Patent: Aug. 4, 2015

(54) SOLID AXLE STEERING AND SUSPENSION SYSTEMS

(71) Applicant: Ronald Scott Bandy, Sanablo, CA (US)

(72) Inventor: Ronald Scott Bandy, Sanablo, CA (US)

( * ) Notice: Subject to any disclaimer, the term of this patent is extended or adjusted under 35 U.S.C. 154(b) by 0 days.

(21) Appl. No.: 14/324,105

(22) Filed: Jul. 4, 2014

(51) Int. Cl.
B62D 7/00 (2006.01)
B60G 21/05 (2006.01)
B62D 7/18 (2006.01)
B62D 7/08 (2006.01)
B62D 9/00 (2006.01)
B60G 9/00 (2006.01)

(52) U.S. Cl.
CPC ............ B60G 21/05 (2013.01); B60G 9/00 (2013.01); B62D 7/08 (2013.01); B62D 7/18 (2013.01); B62D 9/00 (2013.01)

(58) Field of Classification Search
CPC combination set(s) only.
See application file for complete search history.

(56) References Cited

U.S. PATENT DOCUMENTS

| | | | | |
|---|---|---|---|---|
| 2,555,649 A * | 6/1951 | Krotz | | 280/124.13 |
| 2,669,315 A * | 2/1954 | Butterfield | | 180/345 |
| 2,812,191 A * | 11/1957 | Kersey, Jr. et al. | | 180/409 |
| 2,994,396 A * | 8/1961 | Bidwell | | 180/435 |
| 3,903,831 A * | 9/1975 | Bartlett et al. | | 114/344 |
| 4,120,509 A * | 10/1978 | Reeve et al. | | 280/81.6 |
| 4,146,103 A * | 3/1979 | Walter | | 180/24 |
| 4,336,953 A * | 6/1982 | Low | | 280/93.508 |
| 4,415,179 A * | 11/1983 | Marinelli | | 280/124.116 |
| 4,804,205 A * | 2/1989 | Parsons | | 280/686 |
| 4,988,120 A | 1/1991 | Jones | | |
| 5,000,476 A | 3/1991 | Lindorfer et al. | | |
| 5,269,546 A * | 12/1993 | Pollock et al. | | 280/81.6 |
| 5,340,138 A * | 8/1994 | Hurlburt | | 280/93.504 |
| 5,458,359 A * | 10/1995 | Brandt | | 280/124.111 |
| 5,524,921 A * | 6/1996 | Ellingsen | | 280/124.116 |
| 5,636,857 A | 6/1997 | Tandy, Jr. et al. | | |
| 5,820,147 A | 10/1998 | Rohweder et al. | | |
| 5,934,404 A | 8/1999 | DeLellis et al. | | |
| 6,042,131 A | 3/2000 | Bailey | | |
| 6,270,282 B1 * | 8/2001 | McLaughlin | | 403/158 |
| 6,752,403 B2 * | 6/2004 | Allen et al. | | 280/6.157 |
| 7,165,777 B2 | 1/2007 | Ziech et al. | | |
| 7,350,792 B1 | 4/2008 | Garman | | |
| 7,401,677 B2 * | 7/2008 | Boyle et al. | | 180/444 |
| 8,328,210 B2 * | 12/2012 | English et al. | | 280/124.106 |
| 8,342,565 B2 * | 1/2013 | Hata | | 280/680 |
| 8,950,521 B2 * | 2/2015 | Piontek | | 180/6.32 |

OTHER PUBLICATIONS

Sales, Accessories/Manual and Power Rack & Pinions, howeperformance.com, 2006.
Samco Fab, Samco Fab Dodge Sand Truck, race-dezert.com, forum, Nov. 27, 2009.
Sales, Chain and Belt Tensioners, snapidle.com, 2008.

(Continued)

Primary Examiner — Nicole Verley

(57) ABSTRACT

Disclosed herein is a system of steering and suspension linkages for a beam-type solid axle arrangement, the steering system designed to operate in conjunction with the suspension system without bumpsteer throughout suspension travel. Accurate steering throughout suspension travel is satisfied with mechanical linkages that include a unique flexible joint-mounted bellcrank. The suspension system comprises two pairs of links, each pair occupying opposite sides of a solid axle, this opposed configuration offering the axle centering capability of without the packaging constraints of a triangulated 4-link suspension system, thereby facilitating its installation on production-based front solid axle vehicles.

7 Claims, 20 Drawing Sheets

(56) References Cited

OTHER PUBLICATIONS

Mudinyeri, Single vs. Double Triangulated Suspensions, pirate4x4.com, General 4x4 Discussion, Dec. 29, 2008.

Running925, Front Triangulated 4-link, no track bar?, pirate4x4.com, Brand Specific Tech-Jeep Hardcore, Feb. 12, 2013.

Gohnracing, 44 link front, pirate4x4.com, Brand Specific Tech-Chevy, Nov. 29, 2012.

Chirper, Bump stops, limit straps and all of that such, classicbroncos.com, forum, 66-77 Ford Bronco, Jan. 28, 2014.

ALITTKLE1, COBALT327, Jon Crosley, 4-link suspension, crankshaftcoalition.com, wiki.

* cited by examiner

SOLID AXLE STEERING AND SUSPENSION SYSTEMS

CROSS-REFERENCE TO RELATED APPLICATIONS

This application represents a vehicle steering and suspension systems whereby the spring and damping means for the suspension system are supplied by the segmented air shock absorber. This novel shock absorber is covered in U.S. patent application Ser. No. 13/854,055.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

The link style suspension system represents a common type of suspension system utilized on vehicles equipped with a solid or beam axle. The link style suspension system offers a compliant and well-functioning method of mounting/suspending the axle to the vehicle; and, involves several different links, including upper control links, lower control links, and usually a lateral stabilizing device such as a Panhard or track bar. The combination of these links enables the axle to travel and articulate rather freely, while still providing a relatively stable platform for the vehicle to be suspended on.

The Panhard bar can lead to deficiencies in suspension and steering systems, particularly when the Panhard bar is oriented alongside the draglink. When the vehicle encounters a road obstruction, the control links react to the obstruction by allowing the axle to either compress upward closer to or extend away from the vehicle frame, the reaction causing: First, the Panhard bar arcs upwards or downwards, respectively, thereby exerting a lateral force on the axle perpendicular to the direction of the vehicle. Since the wheels are attached to the axle and planted on the ground, the lateral force acting on the axle is translated to the vehicle body which responds by moving perpendicular to the direction of the vehicle. This translational motion is bump-induced yaw. Second, when the endpoints on the Panhard bar fail to coincide with the endpoints on the draglink, the Panhard bar and draglink move through different arcs. The differing arcs serve to turn the steering knuckles even though the steering wheel is not turned, this unintentional turning is known as bumpsteer.

Bumpsteer and bump-induced yaw both contribute to an uncomfortable ride and make a vehicle handle poorly. Bumpsteer can be minimized by designing the steering system to transmit steering input from the frame to the axle with mechanical linkages that substantially coincide with at least one of the suspension control links. Bump-induced yaw can be eliminated with methods that center the axle beneath the vehicle throughout suspension travel: one method involves replacing the Panhard bar with another type of lateral stabilizing device, e.g., a Watts link; a second method involves using a suspension system that does not require a lateral stabilizing device, e.g., a triangulated 4-link suspension system.

The triangulated 4-link suspension system is a link-style suspension system that uses only four control links to completely locate the axle fore and aft and side-to-side beneath the vehicle throughout suspension travel. In particular, the angling of at least two of the four control links keeps the axle centered beneath the vehicle throughout suspension travel thereby controlling the side-by-side motion of the axle. Therefore the angulation of the control links serves the same purpose as does the lateral stabilizing device and eliminates the need for the lateral stabilizing device in the triangulated 4-link suspension system; a quality unique to the triangulated 4-link suspension system among all other link-style suspension systems (except the wishbone 3-link). The triangulated 4-link suspension system has seen extensive service as a rear suspension system on production based vehicles, for example on General Motors' G-Body cars from 1978-1988 and Ford's Fox platform vehicles. Although widely respected as a rear suspension system, the triangulated 4-link suspension system is unknown as a front suspension system for production based vehicles.

Most of this neglect of the triangulated 4-link suspension system as a front suspension system appears derived from automobile manufacturers trending away from beam axle front suspension systems and toward independent front suspension systems. However, part of this neglect is likely due to packaging constraints. The configuration of the angled control links in the triangulated 4-link suspension system requires ample space within the frame for proper installation and operation. Much of the area forward of the firewall is occupied by the engine and its attendant cooling, electrical, and control systems, thereby leaving little free space to accommodate the angled control links in a triangulated 4-link suspension system. Given that Ford's Super Duty trucks, Dodge's Ram heavy duty trucks, and Jeep's Wrangler utility vehicles are all produced with a solid front drive axle (when equipped), that the front suspension systems on all these vehicles include a Panhard bar, the deficiencies surrounding the Panhard bar as discussed above, and the continued strong demand for these vehicles by the public, then clearly a triangulated 4-link suspension system that can be incorporated into the front end of these vehicles would greatly benefit the automobile manufacturers, light pickup truck/utility vehicle market, and motoring public. The present invention represents a triangulated 4-link suspension system and associated steering system specifically designed to address these issues.

BRIEF SUMMARY OF THE INVENTION

Particular arrangements of the present invention comprise a system of linkages which govern vehicle steering as well as locate the axle throughout the full range of suspension travel.

The system of steering linkages includes a chain and sprocket assembly, steering box, steering shaft, two draglinks, two tie rods, joint-mount bellcrank, and lever arm. The chain and sprocket assembly is located mostly on the firewall behind the dash and slightly below the passenger side firewall whereby steering input is transmitted from the steering column through the chain and sprocket assembly, then through the steering shaft to the steering box. The steering box is located behind the output shaft of the chain and sprocket assembly, beneath the passenger side floorboard, and next to the transmission cross-member, and uses a first draglink to transmit steering input to a joint-mount bellcrank. The bellcrank is attached to the front passenger lower link axle joint, the attachment serving to isolate the bellcrank from the lateral rotation of the front axle. The front driver and passenger lower link axle joints serve as flexible joints for the axle ends of the front lower links.

In one particular arrangement, a second draglink transmits steering input from the bellcrank to the lever arm. The lever arm has a mid-point, and pivot and swing ends, whereby the mid-point is attached to the second draglink and the pivot end is fastened to the floor of a truss while the swing end is attached to the tie rods. The lever arm uses the tie rods to transmit steering input to both driver and passenger steering knuckles. In another particular arrangement, the second draglink transmits steering input directly from the bellcrank to the driver steering knuckle. Then a crossover tie rod connects the driver and passenger steering knuckles together and acts to transmit steering input from the driver steering knuckle to the passenger steering knuckle.

By controlling suspension travel particularly compression, the angular displacement of the other end of the second draglink is irrelevant the effect of which, in combination with the isolated bellcrank and the endpoints of the first draglink being coincident with those of the front passenger lower link, all cooperate to minimize bumpsteer throughout suspension travel.

In a third particular arrangement, a rack and pinion steering system replaces the steering box steering system. Known in the art for use on vehicles equipped with beam or solid front axles, the rack and pinion steering box is highly respected for steering precision and is commonly used to replace the recirculating ball steering box in vehicle steering systems. Mounted to the front axle, a slow-ratio rack and pinion steering box that is connected directly to a quick-ratio chain and sprocket assembly with a telescoping steering shaft will operate with minimal bumpsteer throughout suspension travel and articulation.

The system of suspension linkages includes two pairs of control links, the links collectively acting to locate the axle in all axes throughout suspension travel. The link configuration represents a pair of upper links and a pair of lower links each pair occupying opposing sides of the axle, whereby the angulation of the upper links keeps the axle centered beneath the vehicle throughout suspension travel thereby controlling the axle's side-to-side motion and eliminating the need for a lateral stabilizing device. The configuration is described herein with the pair of upper links being positioned between the end of the frame and axle and being angled inward from the end of the frame to the axle; and the lower links being positioned between the transmission cross-member and axle and being angled outward from the transmission cross-member to the axle. The axle ends of the upper links converge at and are attached to the top of the truss or rear differential housing, the truss or rear differential housing is located at the center of the front or rear axle, respectively. The positioning of the upper links between the end of the frame and axle opens up ample free space in the engine bay to accommodate powertrain and related components such as the engine, radiator, exhaust, accessory drive pulleys, belts, and hoses, and electrical units; thereby making the present invention a suitable triangulated 4-link front suspension system for production based vehicles.

BRIEF DESCRIPTION OF THE SEVERAL VIEWS OF THE DRAWINGS

List of Reference Numerals Utilized in the Drawings

10—frame
11—transmission cross-member
12—firewall
13—chain and sprocket assembly
14—steering box
15—steering column
16—steering shaft
17—pitman arm
18—bellcrank
19—lever arm
20—first draglink
21—second draglink
22—driver tie rod
23—passenger tie rod
24—front axle
25—front upper link
26—front lower link
27—front driver lower link axle joint
28—front passenger lower link axle joint
29—truss
30—front upper link axle bracket
31—front upper link frame bracket
32—front lower link axle bracket
33—front lower link frame bracket
34—rear axle
35—rear upper link
36—rear lower link
37—rear upper link axle bracket
38—rear upper link frame bracket
39—rear lower link axle bracket
40—rear lower link frame bracket
41—driver steering knuckle
42—passenger steering knuckle
43—segmented air shock absorber
44—air shock mounting brackets
45—shock tower
46—crossover tie rod
47—rack and pinion steering box
48—draglink
49—chain and sprocket assembly first sprocket
50—chain and sprocket assembly second sprocket
51—chain and sprocket assembly top sprocket
52—chain and sprocket assembly bottom sprocket
53—chain and sprocket assembly one chain
54—chain and sprocket assembly other chain
55—chain and sprocket assembly input shaft
56—chain and sprocket assembly output shaft
57—chain and sprocket assembly connector shaft
58—leading arm of bellcrank
59—trailing arm of bellcrank
60—horizontal shaft of axle joint
61—vertical shaft of axle joint
62—metal plate of axle joint
63—post of axle joint
64—top of truss
65—floor of truss
66—U-joint
67—ball joint
68—flexible joint for inner end of link
69—flexible joint for outer end of link
70—front differential housing
71—rear differential housing
72—axle tube

BRIEF DESCRIPTION OF THE DRAWINGS

Figure 1:
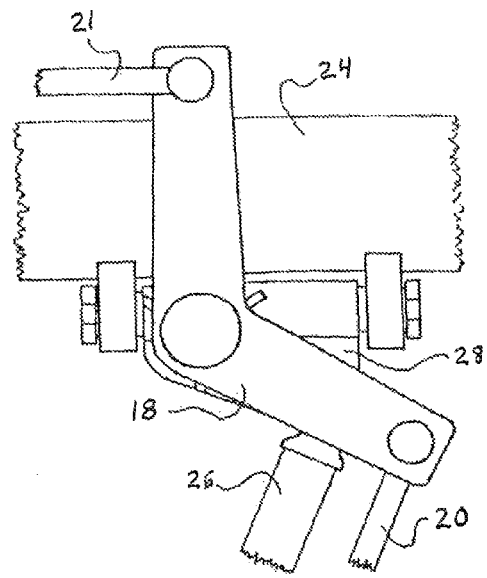
Figure 2:
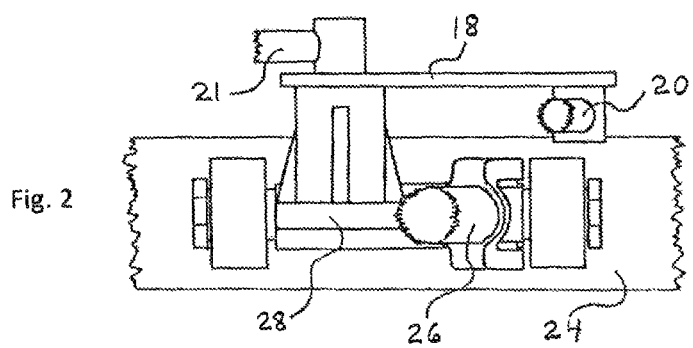
Figure 3:
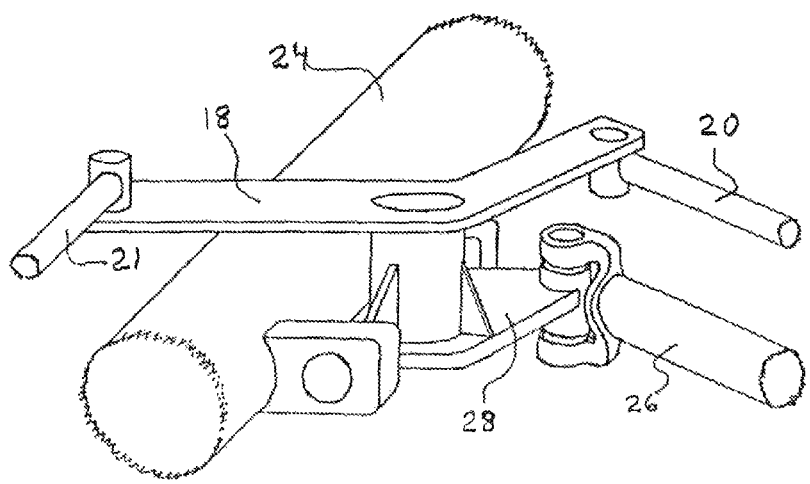
Figure 4:
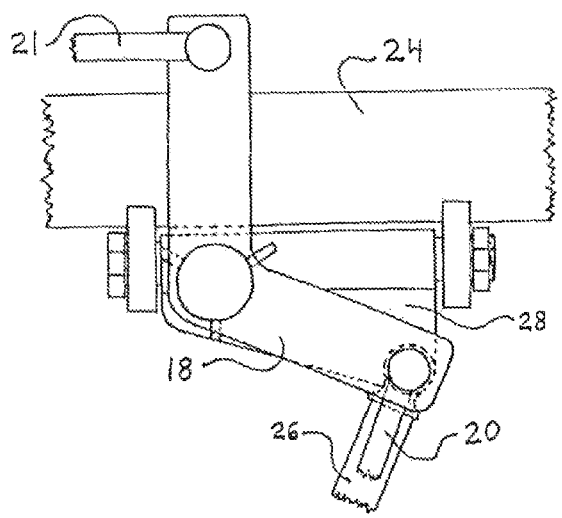
Figure 5:
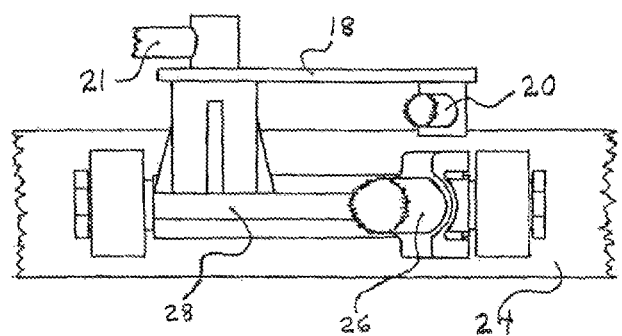
Figure 6:
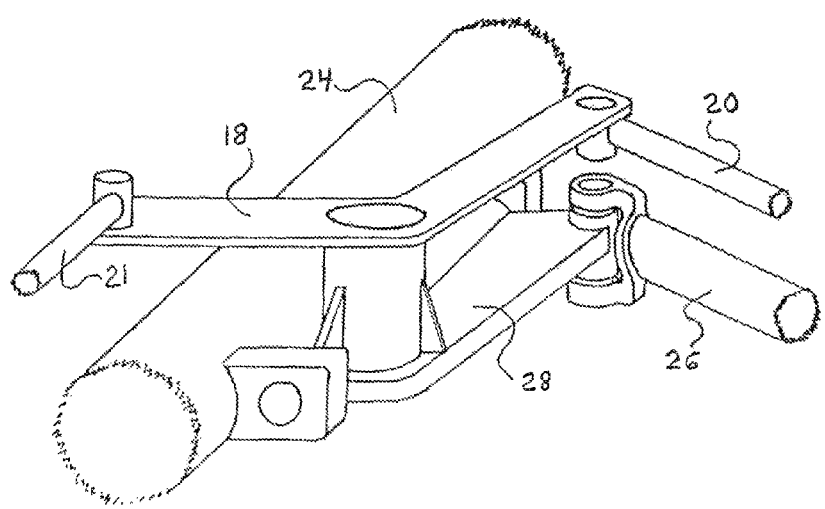
Figure 7:
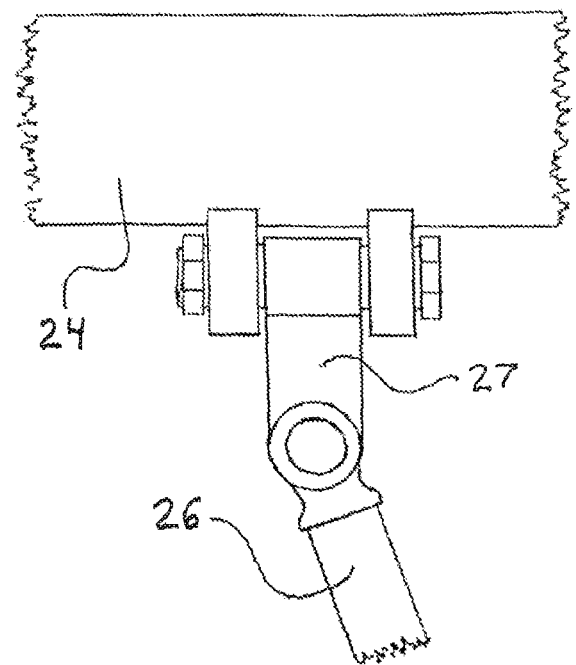
Figure 8:
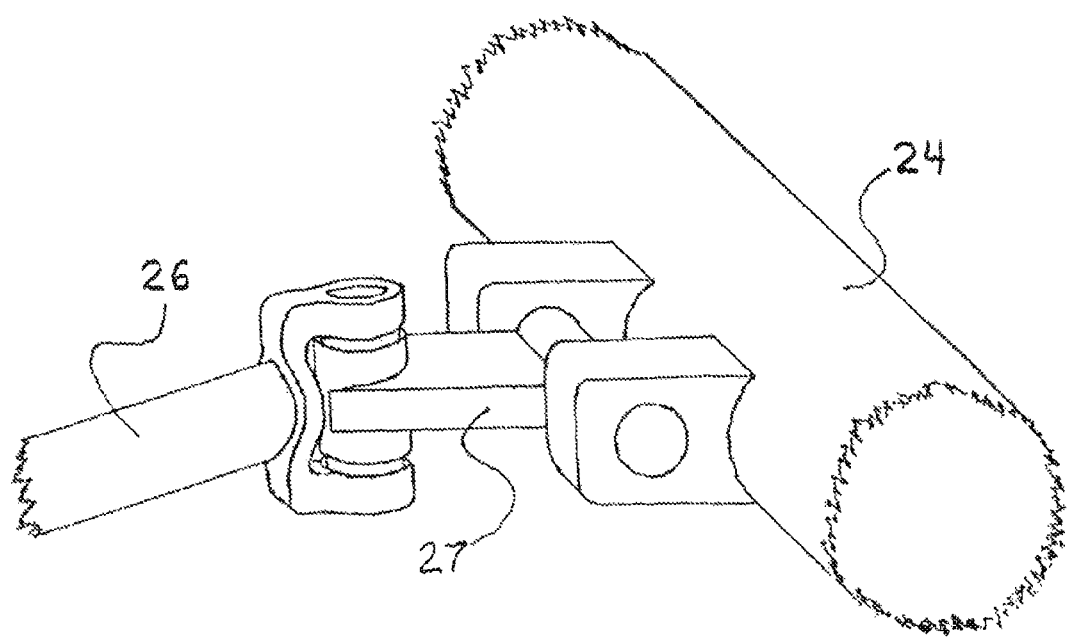
Figure 9:
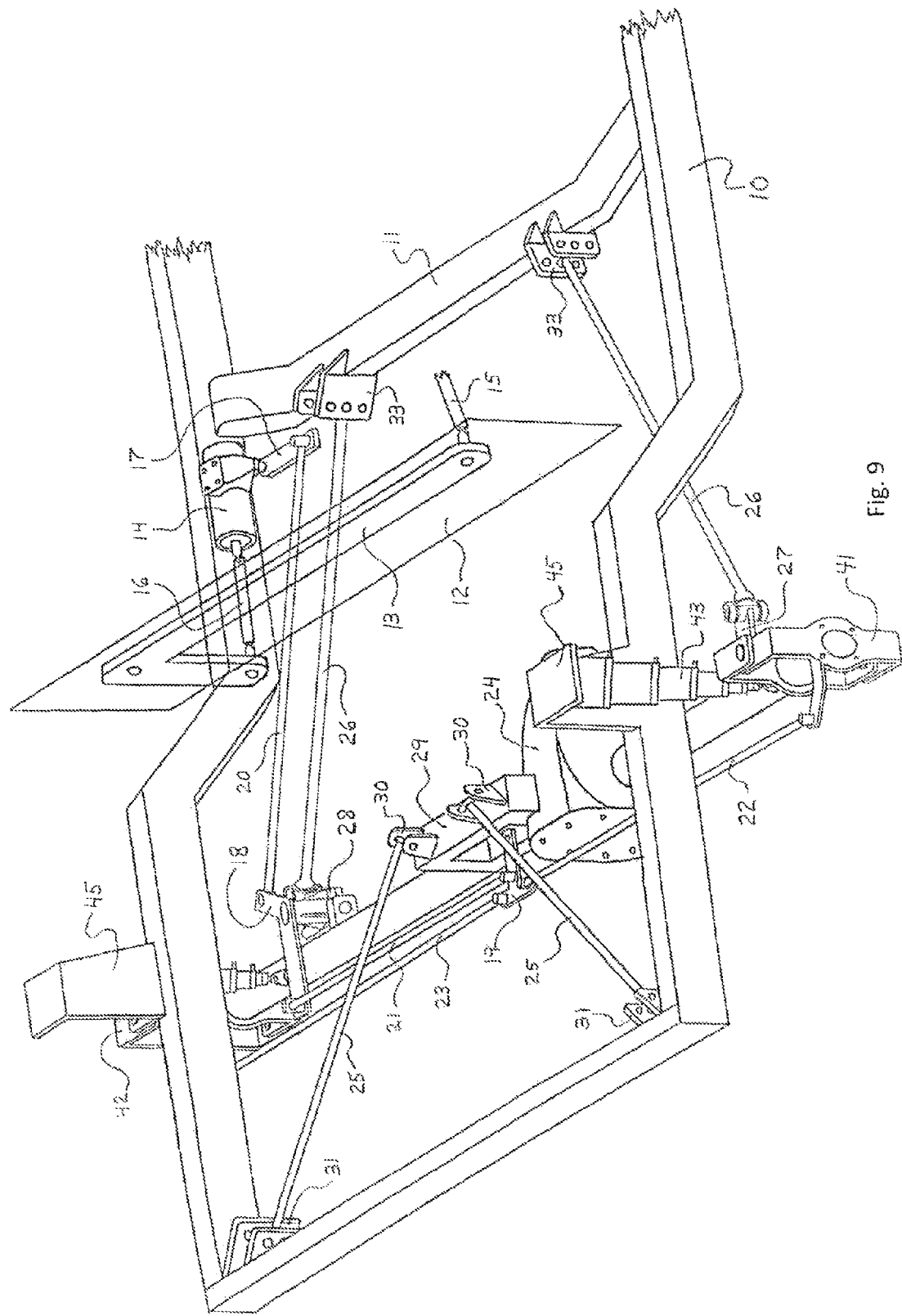
Figure 10:
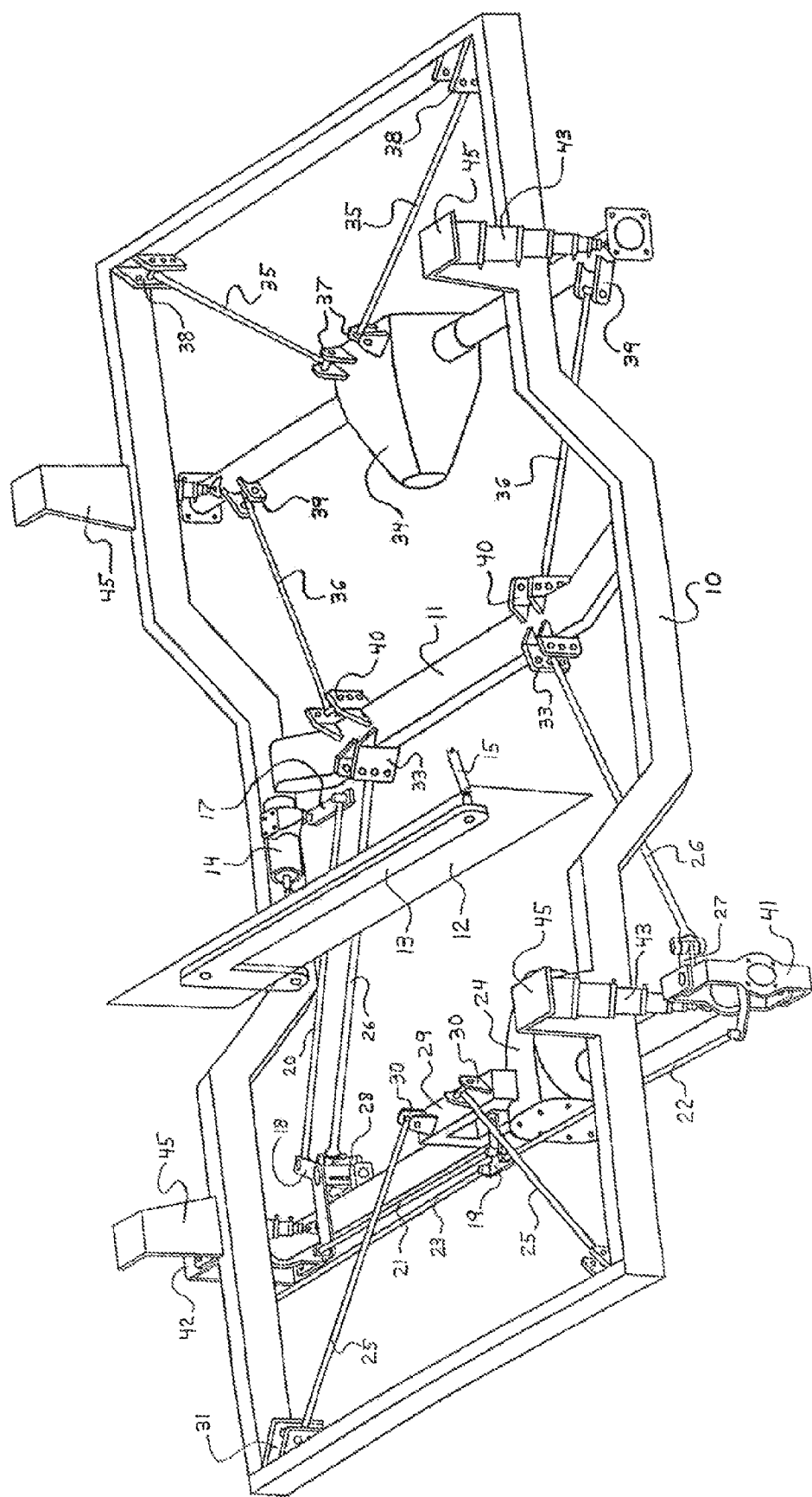
Figure 11:
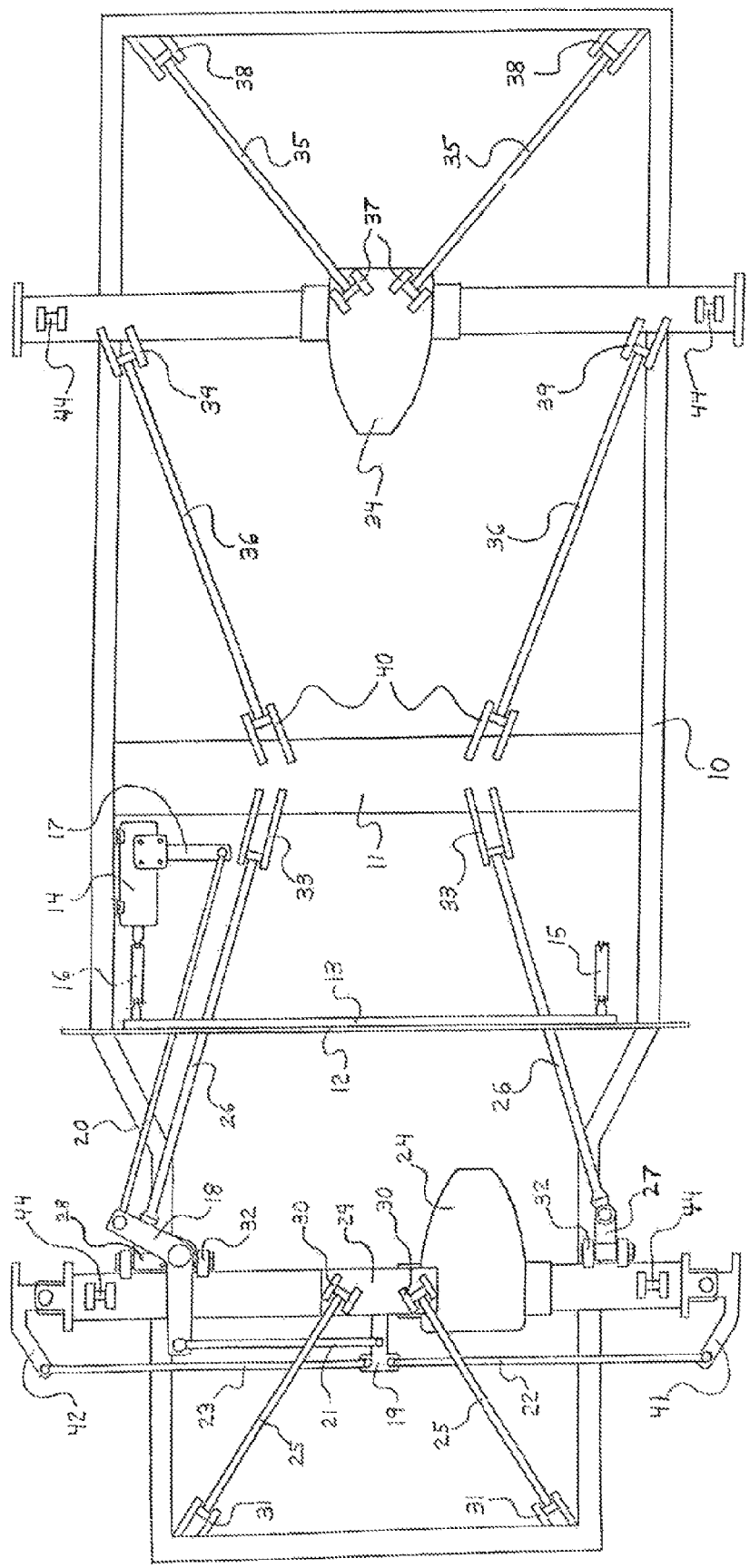
Figure 12:
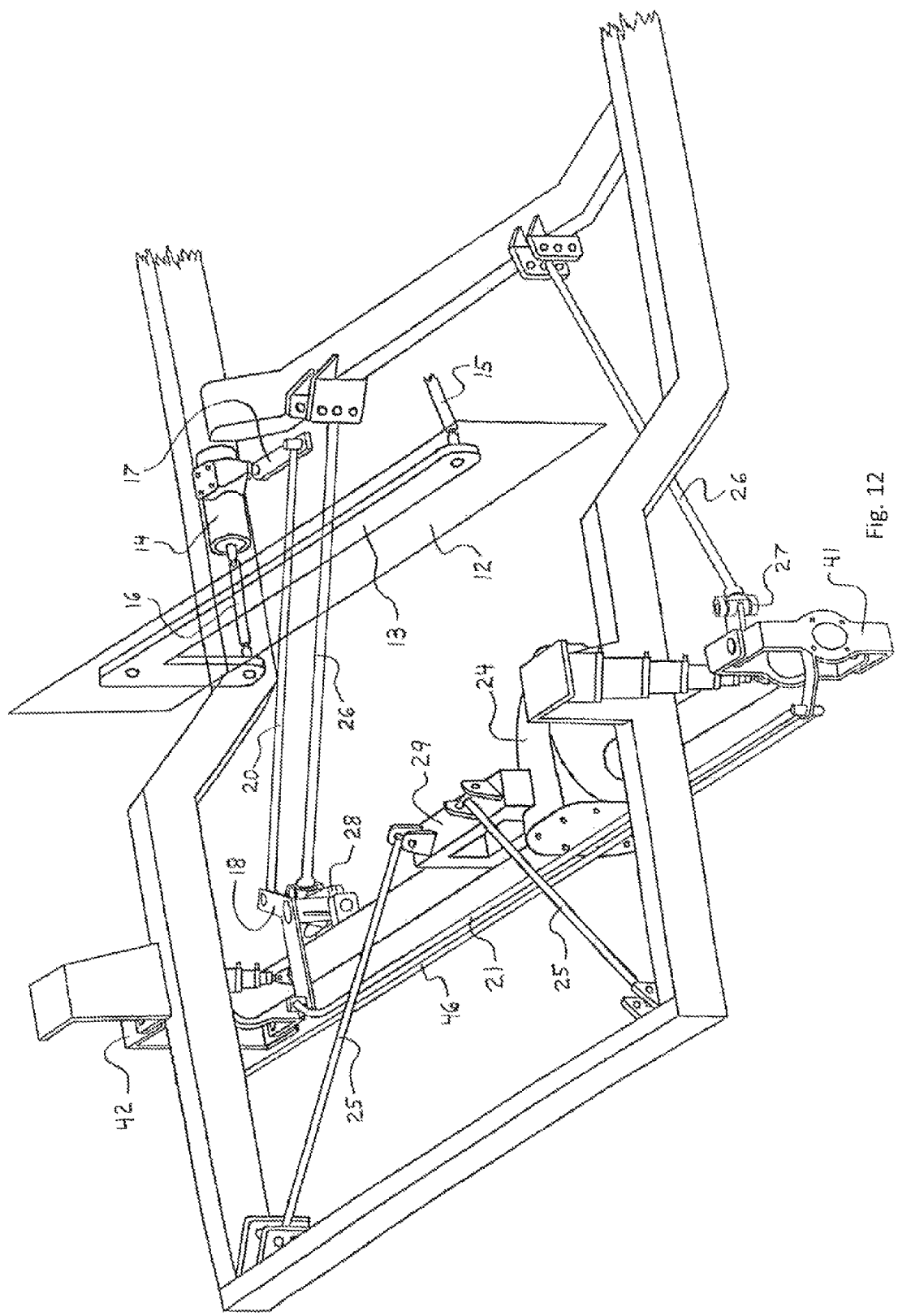
Figure 13:
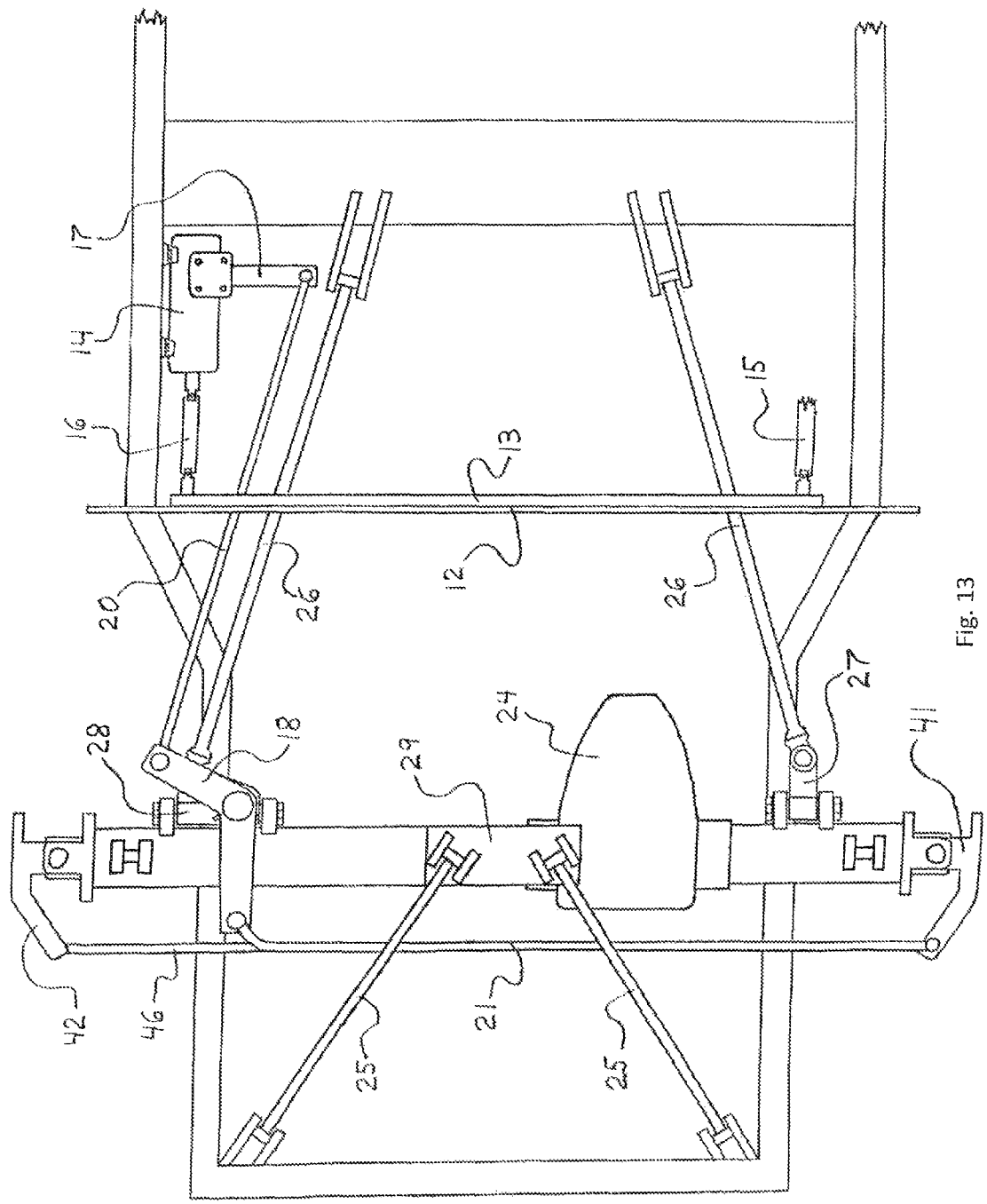
Figure 14:
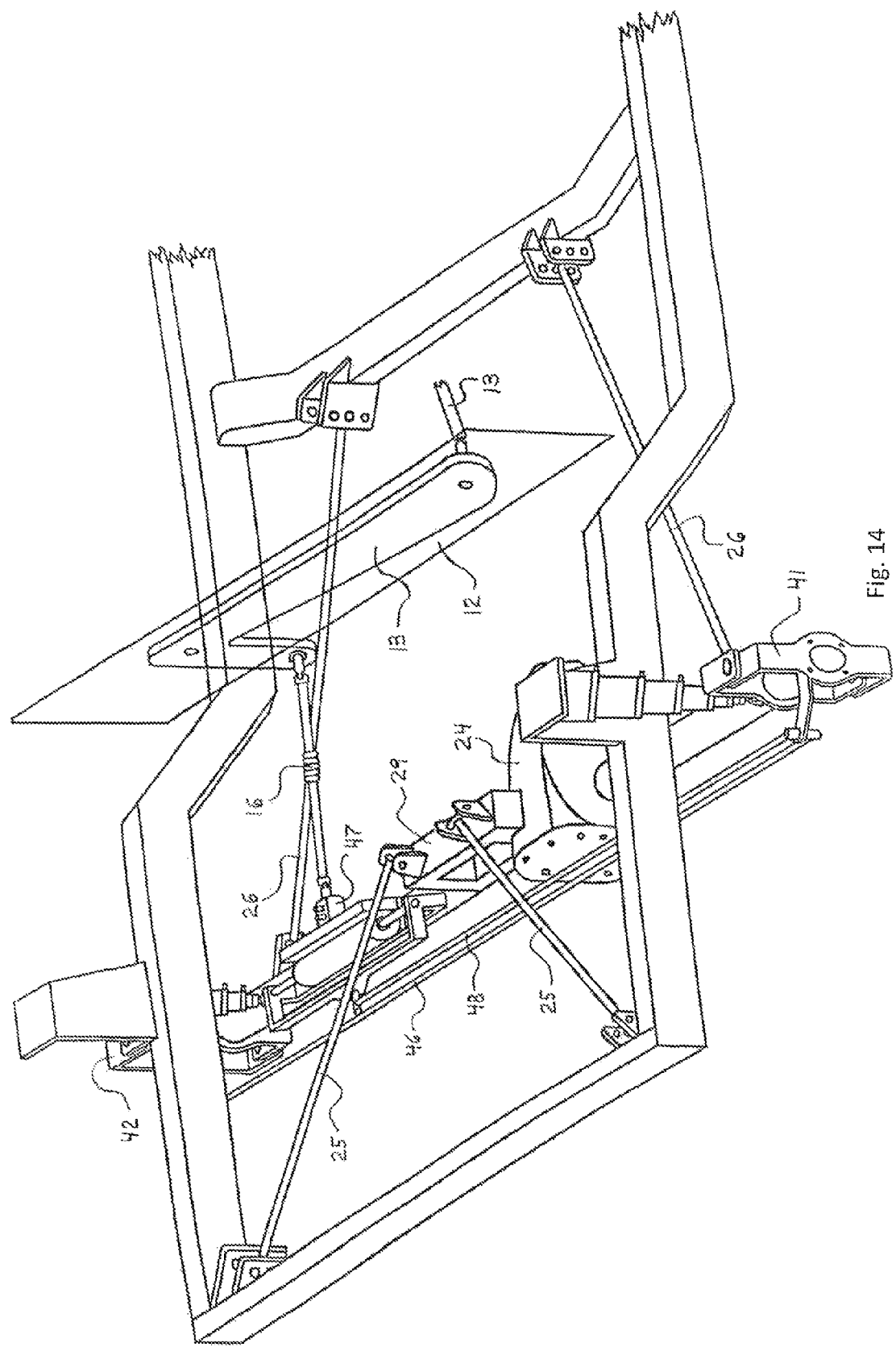
Figure 15:
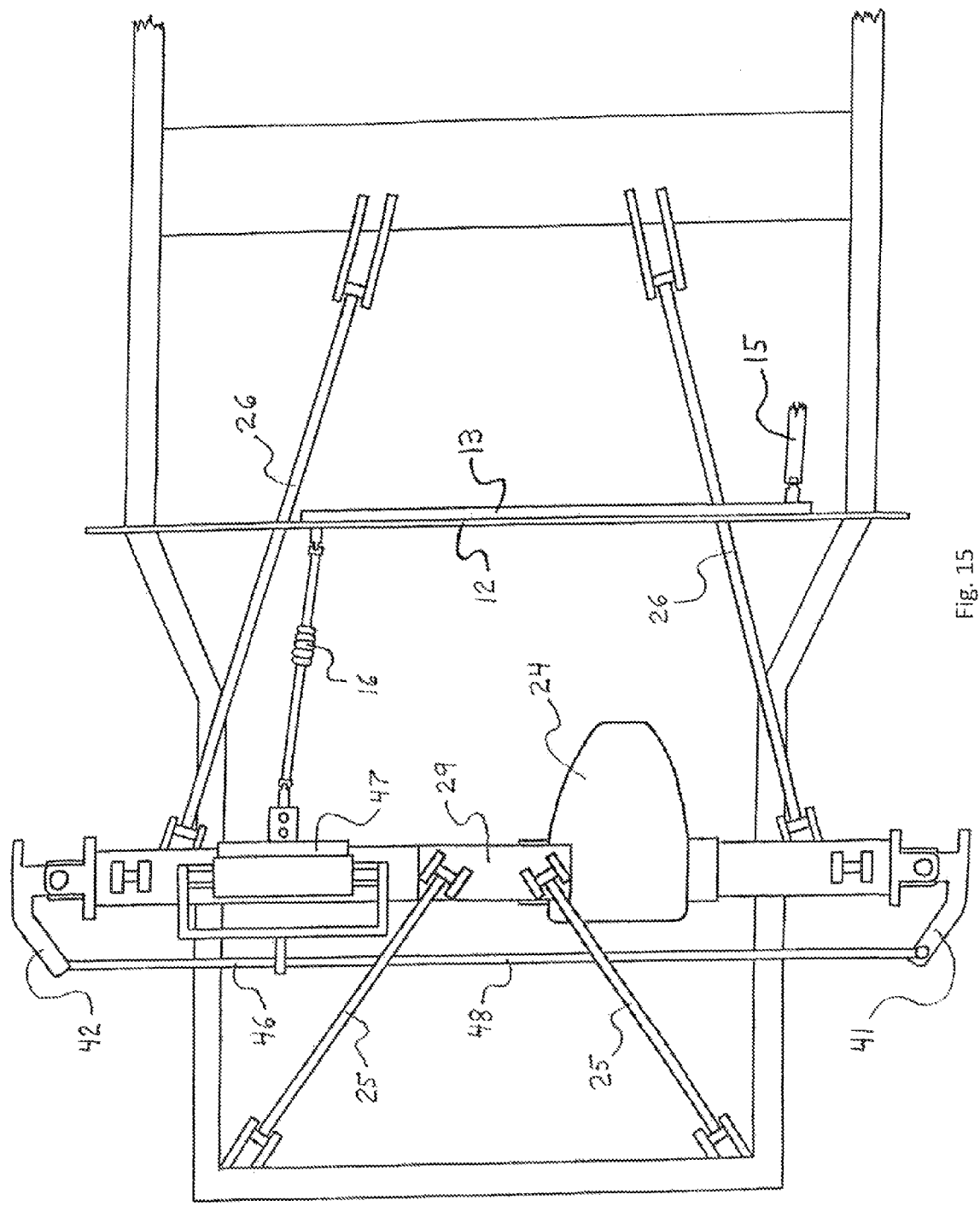
Figure 16:
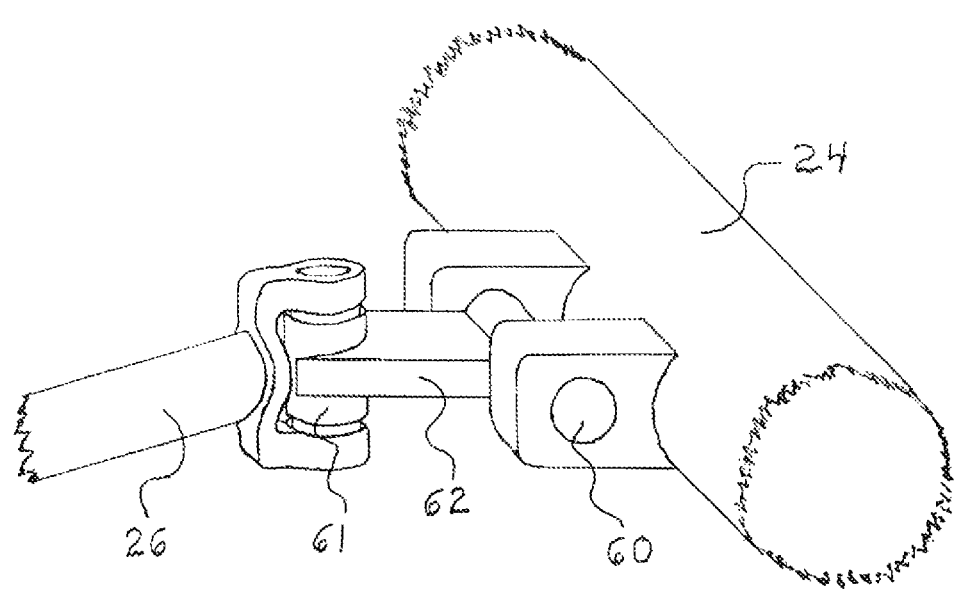
Figure 17:
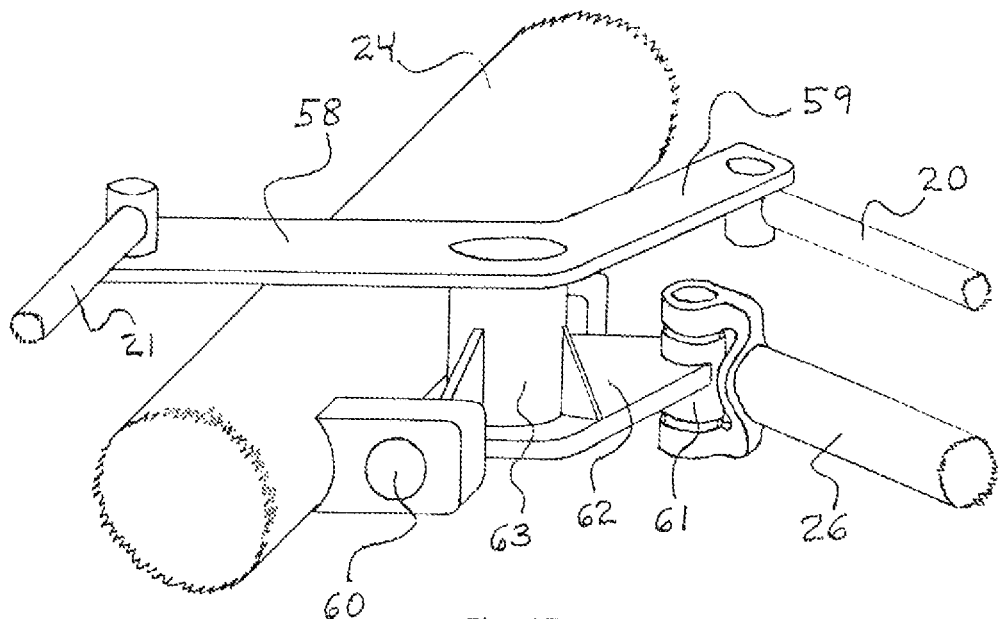
Figure 18:
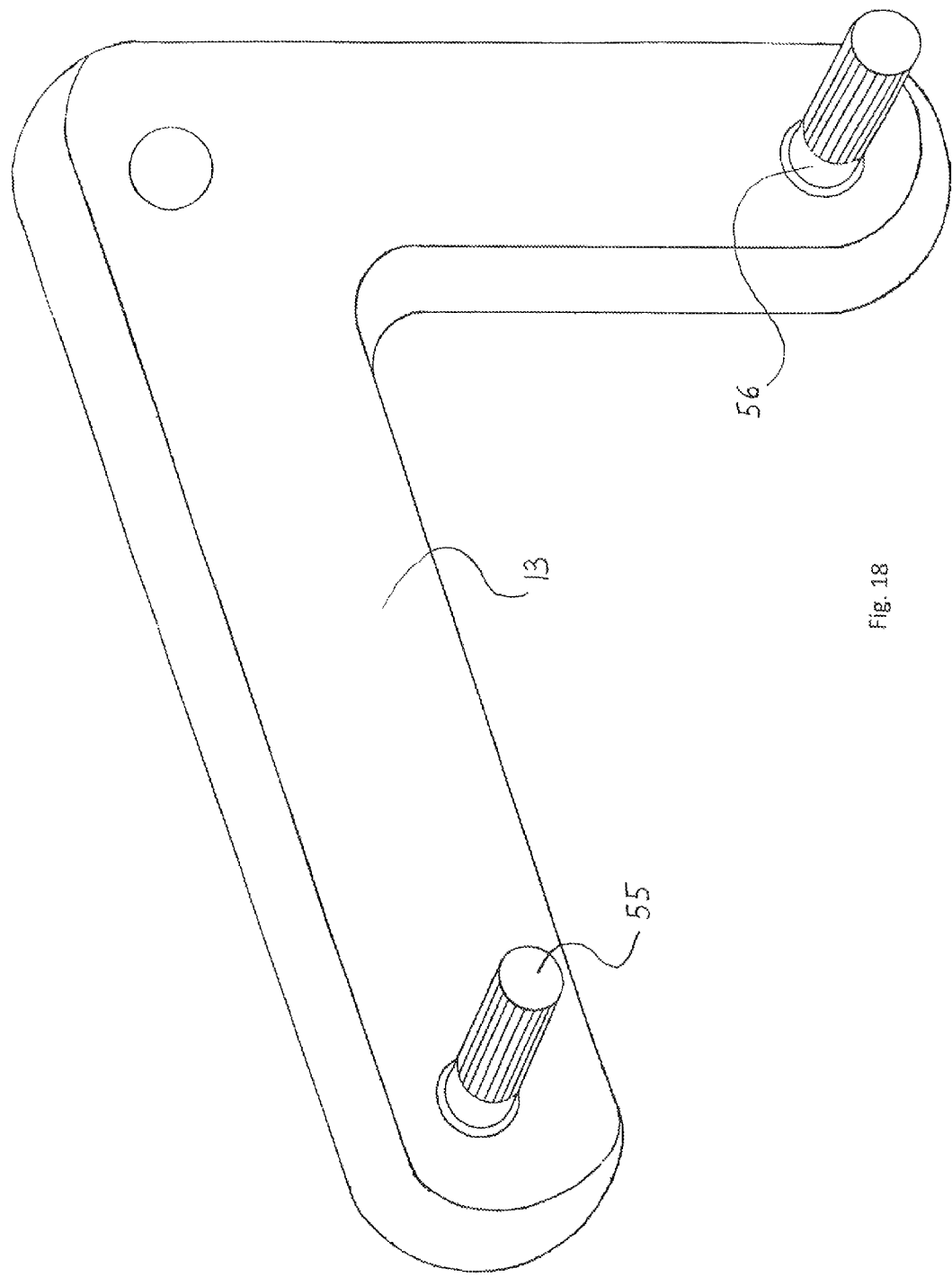

FIG. 1 is a plan view of the type one bellcrank and front passenger lower link axle joint;

FIG. 2 is a backside view of the type one bellcrank and front passenger lower link axle joint;

FIG. 3 is a side perspective view of the type one bellcrank and front passenger lower link axle joint;

FIG. 4 is a plan view of the type two bellcrank and front passenger lower link axle joint;

FIG. 5 is a backside view of the type two bellcrank and front passenger lower link axle joint;

FIG. 6 is a side perspective view of the type two bellcrank and front passenger lower link axle joint;

FIG. 7 is a plan view of the front driver lower link axle joint;

FIG. 8 is a side perspective view of the front driver lower link axle joint;

FIG. 9 is a front side perspective view of the bellcrank/driver passenger tie rods steering and front suspension systems for a vehicle equipped with solid axles;

FIG. 10 is a front side perspective view of the bellcrank/driver passenger tie rods steering and front and rear suspension systems thereof;

FIG. 11 is a plan view of the bellcrank/driver passenger tie rods steering and front and rear suspension systems thereof;

FIG. 12 is a front side perspective view of the bellcrank/crossover tie rod steering and front suspension systems thereof;

FIG. 13 is a plan view of the bellcrank/crossover tie rod steering and front suspension systems thereof;

FIG. 14 is a front side perspective view of the rack and pinion steering and front suspension systems thereof;

FIG. 15 is a plan view of the rack and pinion steering and front suspension systems thereof;

FIG. 16 is a front side perspective view of the driver lower link axle joint;

FIG. 17 is a front side perspective view of the passenger lower link axle joint;

FIG. 18 is a front side perspective view of the chain and sprocket assembly

Figure 19:
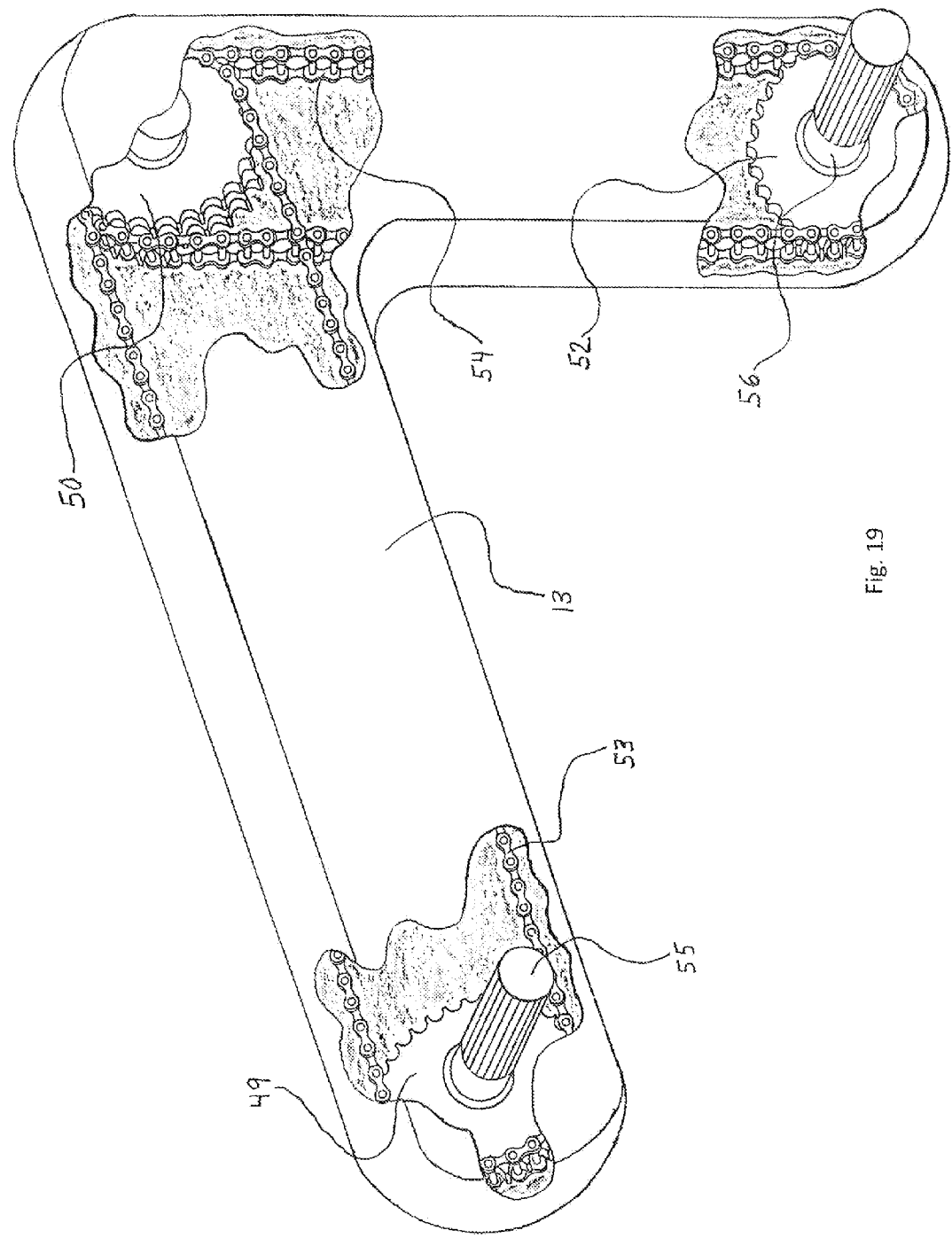
Figure 20:
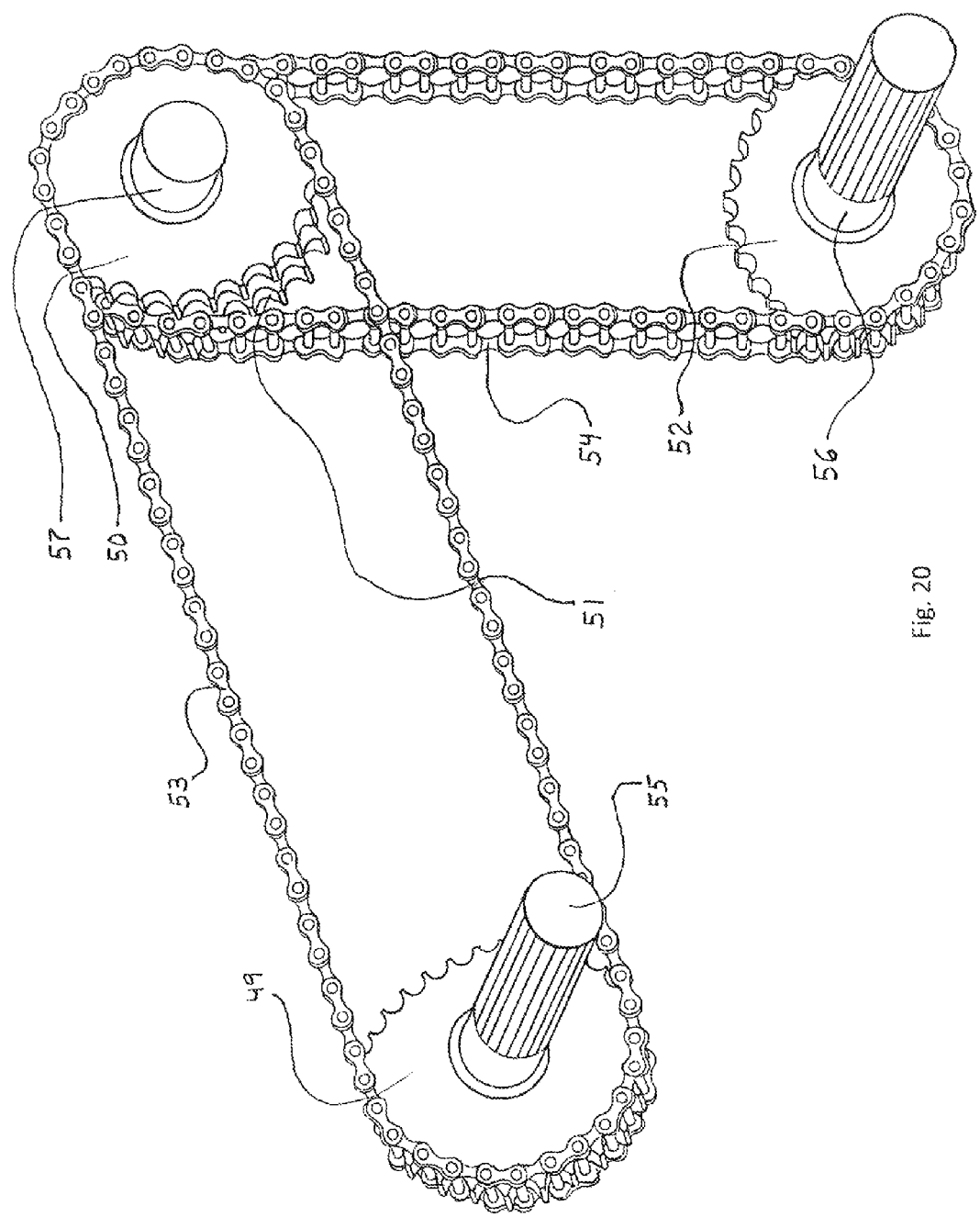
Figure 22:
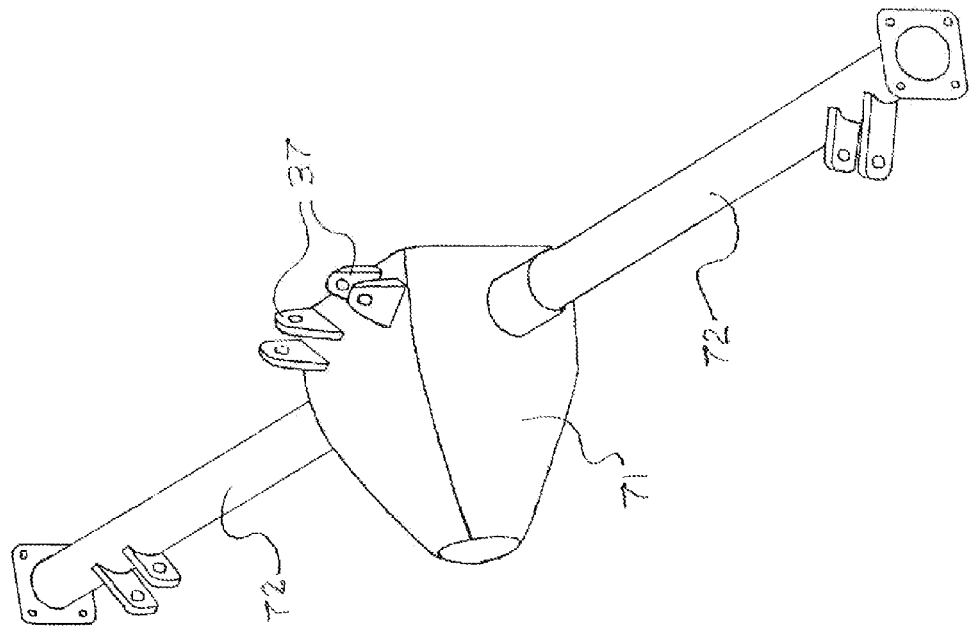
Figure 21:
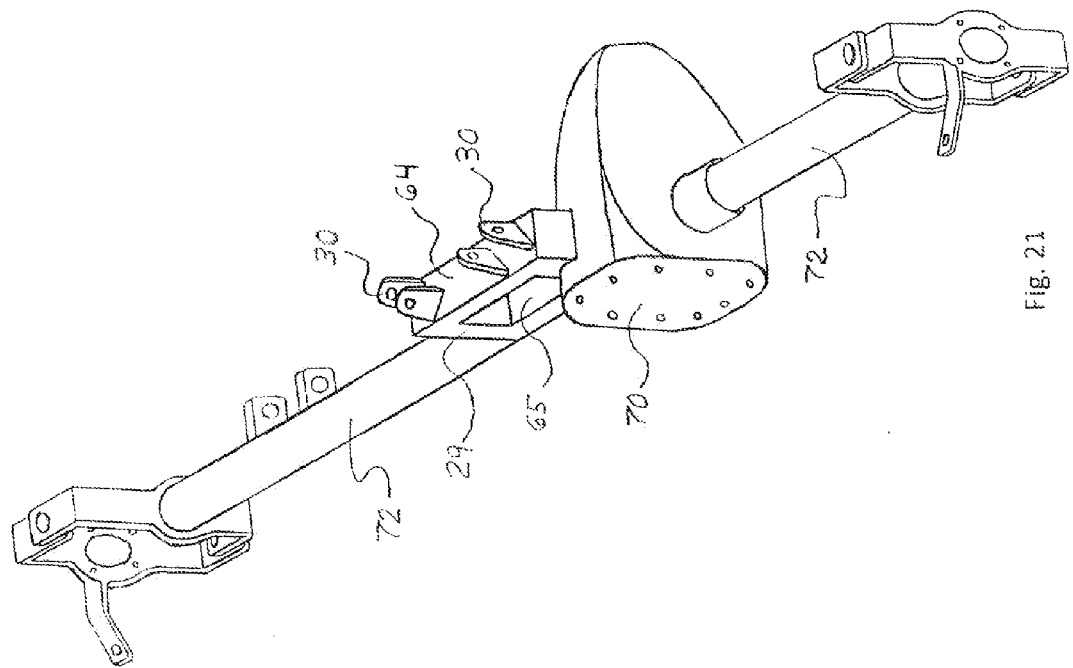
Figure 23:
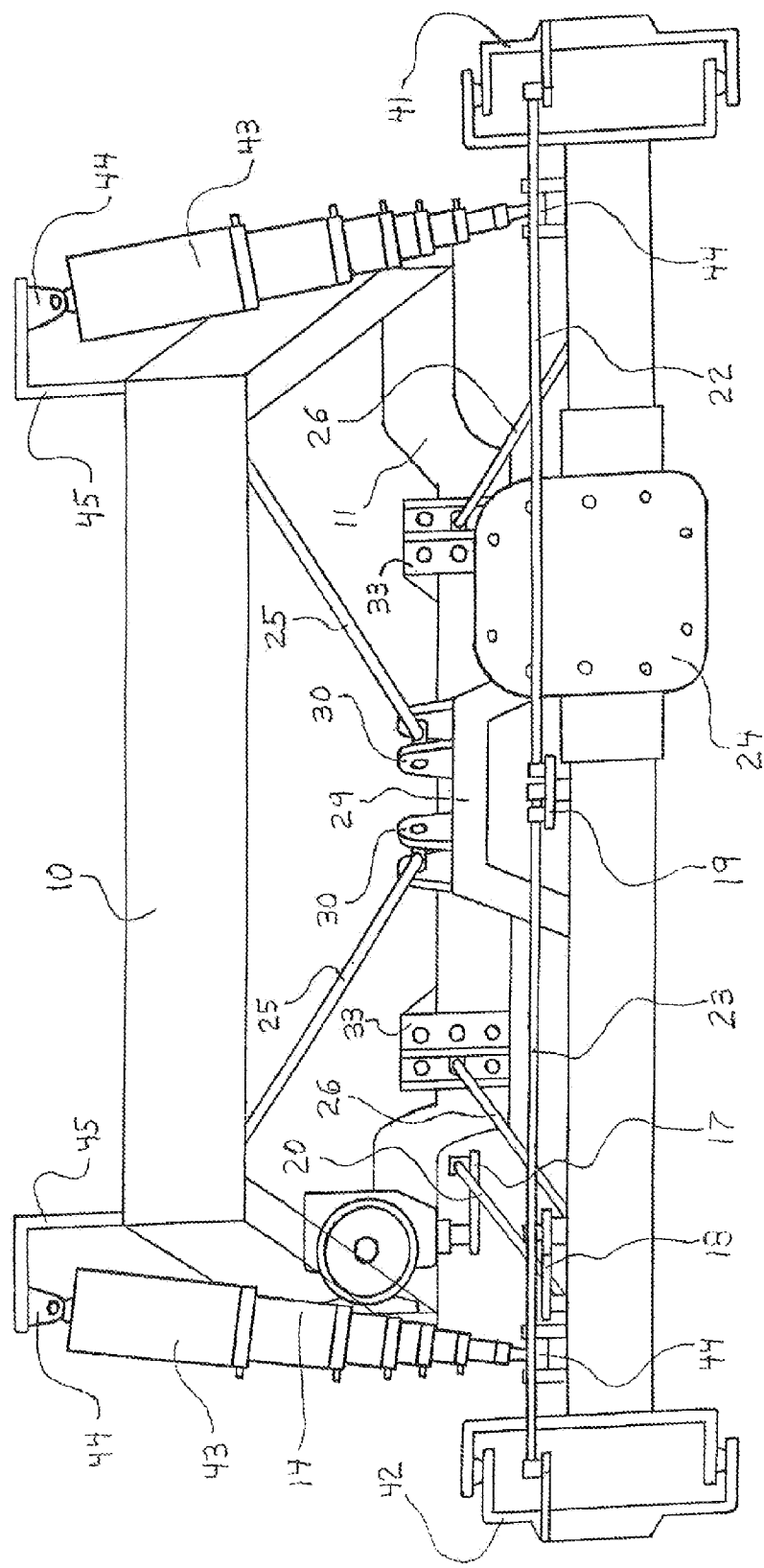
Figure 24:
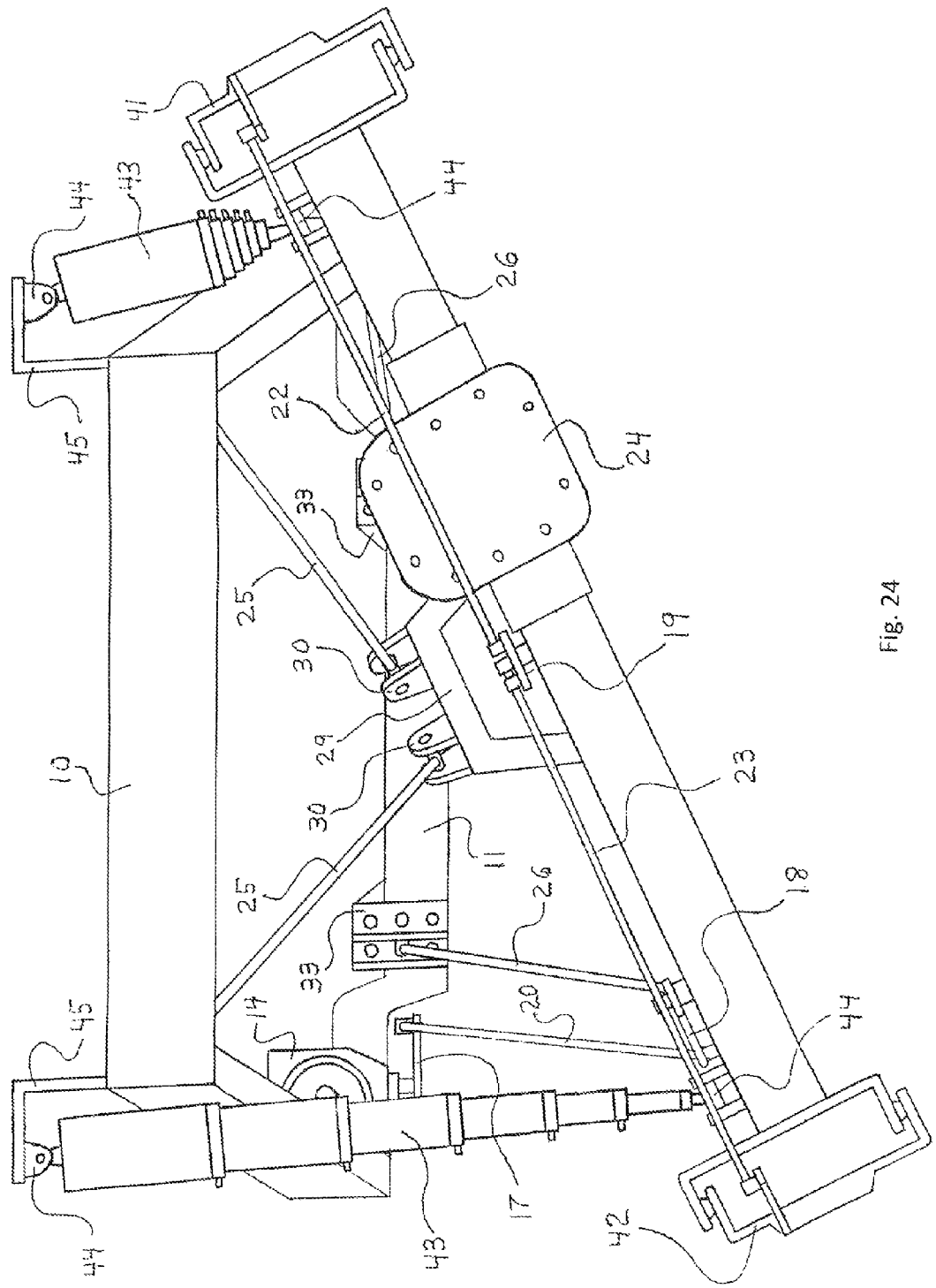
Figure 25:
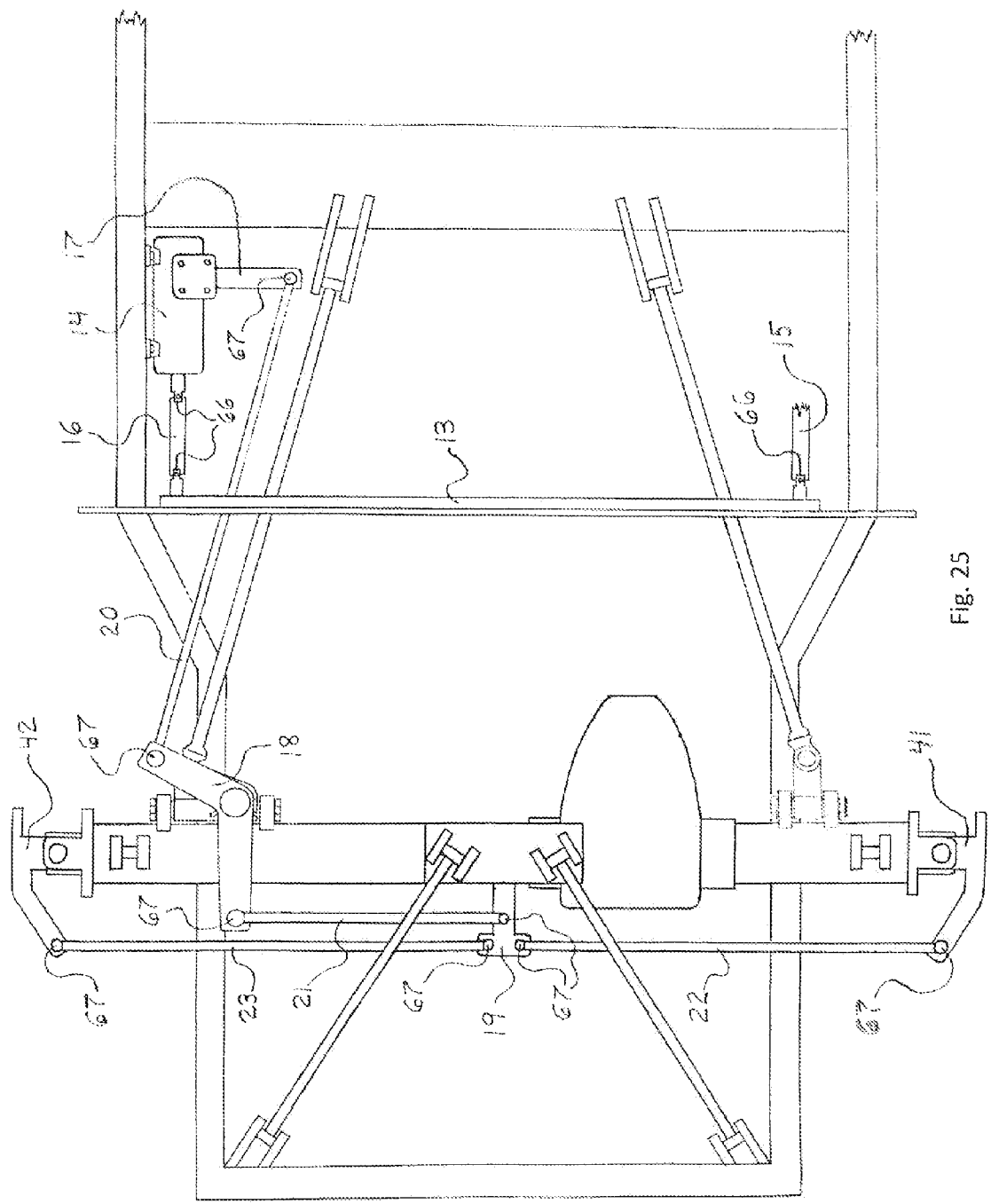
Figure 26:
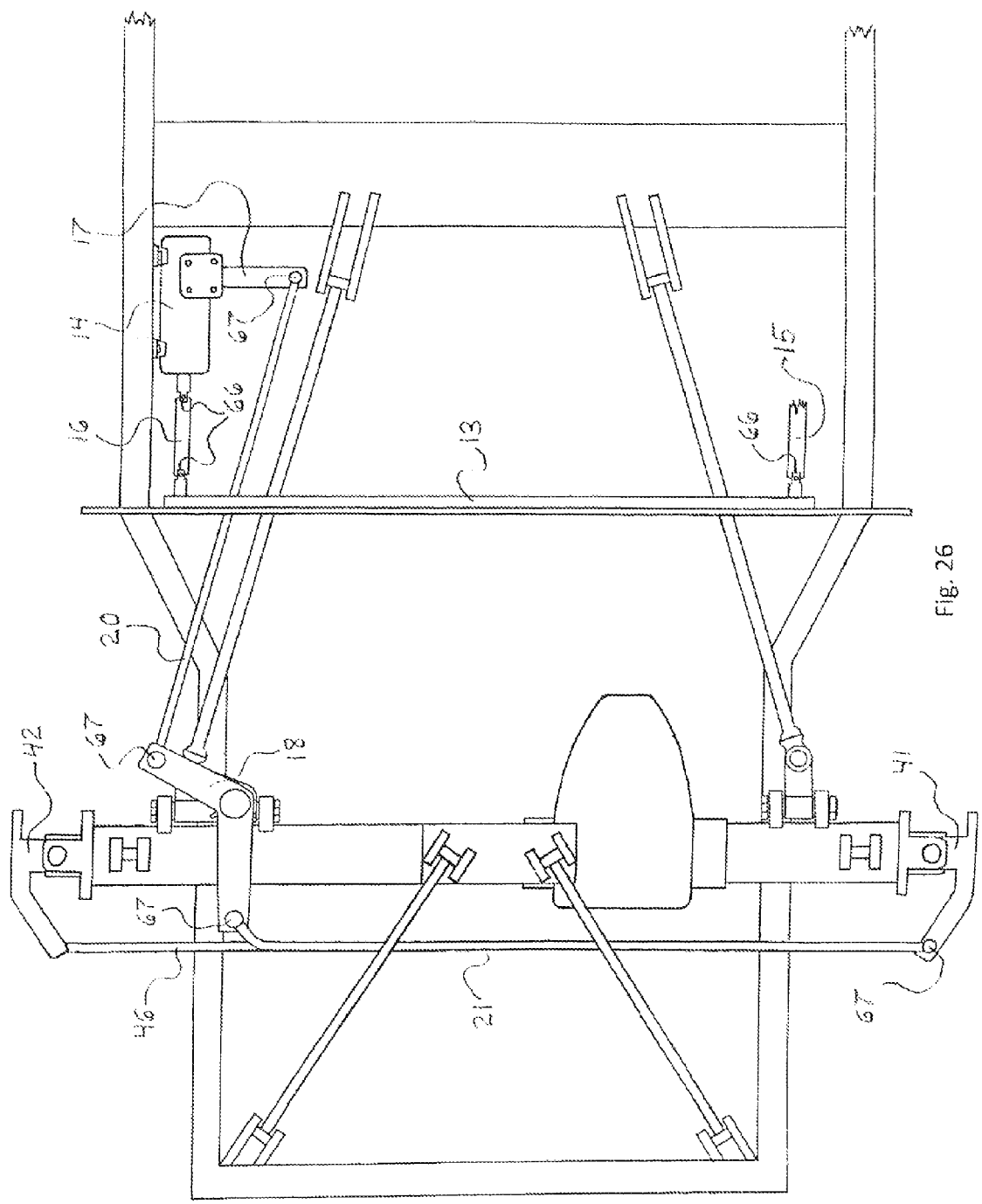
Figure 27:
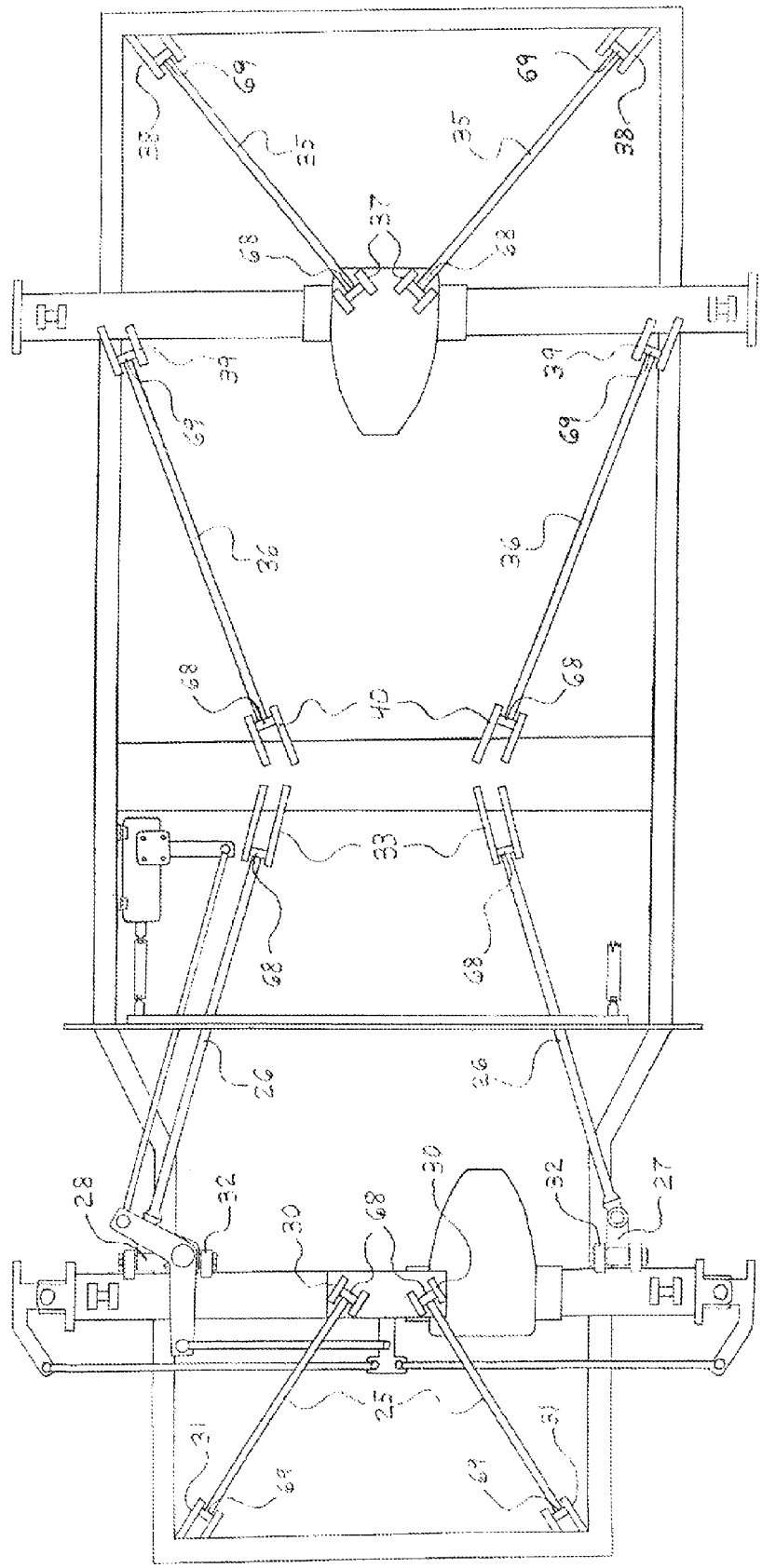

FIG. 19 is a front side perspective view of the cut-away chain and sprocket assembly;

FIG. 20 is a front side perspective view of the gearsets for the chain and sprocket assembly;

FIG. 21 is a front side perspective view of the front axle;

FIG. 22 is a front side perspective view of the rear axle;

FIG. 23 is a front view of the steering and front suspension systems at ride height for a vehicle equipped with solid axles;

FIG. 24 is a front view of the steering and front suspension systems articulated thereof;

FIG. 25 is a plan view of the pivotal connections in the bellcrank/driver passenger tie rods steering system thereof;

FIG. 26 is a plan view of the pivotal connections in the bellcrank/crossover tie rod steering system thereof;

FIG. 27 is a plan view of the pivotal connections in the front and rear suspension systems thereof.

DETAILED DESCRIPTION OF THE INVENTION

The present invention represents steering and suspension systems designed to function with a vehicle whose frame is suspended above solid or beam type axles, the front axle being steerable. Springing and damping means are supplied by the segmented air shock absorber, a shock absorber disclosed in U.S. patent application Ser. No. 13/854,055.

For reference: One, the longitudinal axis refers to a line passing through the center of the frame from front to back. Two, an axle exhibits lateral rotation. Lateral rotation is an artifact of the configuration of the suspension links, this configuration being one in which each pair of links is disposed on opposite sides of an axle and acts to rotate the axle about a line parallel to the lateral axis throughout suspension travel, the lateral axis passing through the center of the frame from one side to the other side. Lateral rotation, which causes a change in pinion/caster angle, can be managed by controlling the range of suspension travel, suspension travel can be controlled with bumpstops and limiting straps. Bumpstops control compression, limiting straps control extension.

About the drawings: in FIGS. 9, 10, 12, and 14, the firewall and chain and sprocket assembly are viewed as being selectively transparent in order to show their relationships to other steering components; in FIGS. 11, 13 and 15, the axles are viewed as being above the frame rather than below the frame and the shock towers are absent in order to highlight the axle connection locations for the lower links, particularly the front axle joints and bellcrank in FIG. 23, the front part of the passenger frame side is viewed as being transparent in order to show the steering box.

Referring to FIGS. 1-8, there are shown in detail the front driver and passenger lower link axle joints 27 and 28, respectively. The axle joints 27 and 28 serve as flexible joints for the axle ends of the lower links 26 in the front suspension system whereby the axle joint 28 also functions as a mounting point for the bellcrank 18. The bellcrank 18 is mounted on the axle joint 28 rather than the front axle 24 in order to isolate the bellcrank 18 from the lateral rotation of the front axle 24, the isolation assisting to eliminate relative motion between the pitman arm 17 and bellcrank 18 throughout suspension travel. The axle joint 27 or 28 is comprised of horizontal and vertical shafts 60 and 61 and a metal plate 62 whereby each shaft is rotationally affixed to the metal plate 62 such that the horizontal shaft 60 is rotationally affixed to one edge of the plate 62 and the vertical shaft 61 is rotationally affixed to another edge of the plate 62. The horizontal shaft 60 serves to rotationally attach the axle joint 27 or 28 to the front axle 24 and the vertical shaft 61 serves to rotationally attach the axle joint 27 or 28 to the axle end of the front lower link 26, the combined effect of the horizontal and vertical shafts 60 and 61 being rotationally attached to the front axle 24 and front lower link 26, respectively, serves to pivotally connect the front axle 24 to the front lower link 26. The metal plate 62 for the axle joint 28 bears a post 63 that rotationally secures the bellcrank 18 to the axle joint 28.

Referring to FIGS. 1-6 and 17, there are shown in detail the bellcrank 18. Being mounted to the axle joint 28, the bellcrank 18 is situated behind the passenger side of the front axle 24, and includes two parts—the leading arm 58 and trailing arm 59—whereby the connection point between the leading and trailing arms 58 and 59 refers to the apex. The leading arm 58 is oriented parallel to the longitudinal axis from the apex towards the front of the vehicle whereby the end of the arm 58 is pivotally attached to the one end of the second draglink 21. The trailing arm 59 is oriented diagonally to the front axle 24 from the apex towards the passenger side of the vehicle whereby the end of the arm 59 is pivotally attached to the other end of the first draglink 20. The apex serves to rotationally attach the bellcrank 18 to the post 63 on the axle joint 28. The dimensions of the metal plate 62 are able to vary thereby allowing the post 63 to be located at different positions relative to the attachment point between the axle joint 28 and axle end of the front passenger lower link 26. This way, the location of the bellcrank 18 on the metal plate 62 serves to counteract the length of the trailing arm 59 and places the other end of the first draglink 20 in close proximity to the axle end of the front passenger lower link 26. The close proximity between the other end of the first draglink 20 and axle end of the front passenger lower link 26 permits the one end of the first draglink 20 to also be placed in close proximity to the frame end of the front passenger lower link 26, the combined close proximities result in the first draglink 20 adopting a close proximity to the front passenger lower link 26. This close proximity between the first draglink 20 and front passenger lower link 26 acts to enhance the coincidence between the first draglink 20 and front passenger lower link 26. The enhanced coincidence between the first draglink 20 and front passenger lower link 26 serves to enhance the similarity of the arcs that the first draglink 20 and front passenger lower link 26 move through during suspension travel and articulation. As the arcs of the first draglink 20 and front passenger lower link 26 become more similar, bumpsteer is reduced and steering precision is improved.

Referring to FIGS. 1-3 in the case of the type one bellcrank 18, the location of the post 63 is selected in order to position the bellcrank 18 such that the other end of the first draglink 20 is placed next to the axle and of the front passenger lower link 26; whereas referring to FIGS. 4-6 in the case of the type two bellcrank 18, the location of the post 63 is selected in order to position the bellcrank 18 such that the other end of the first draglink 20 is placed in vertical alignment with the axle end of the front passenger lower link 26. These different post 63 locations represent two out of numerous possible locations that may serve to minimize bumpsteer in a given suspension link configuration or type of vehicle.

Referring to FIGS. 18, 19, and 20, the chain and sprocket assembly 13 is illustrated in detail. The chain and sprocket assembly 13 is a gearbox comprised of both internal and external components: (1) the internal components include one and the other gearsets, an input shaft 55, an output shaft 56, and a connector shaft 57. Each gearset is comprised of one chain and two sprockets. The two sprockets and chain in one gearset are the first and second sprockets 49 and 50 and one chain 53 while the two sprockets and chain in the other gearset are the top and bottom sprockets 51 and 52 and other chain 54, respectively. Each chain 53 or 54 has links while each sprocket 49, 50, 51, or 52 has teeth. The two sprockets in each gearset are spatially separated from each other, yet indirectly connected to each other via a common association with the chain, the common association refers to the teeth on the first and second sprockets 49 and 50 being able to intermesh with the links on the one chain 53 and the teeth on the top and bottom sprockets 51 and 52 being able to intermesh with the links on the other chain 54. The one gearset is oriented horizontally while the other is oriented vertically whereby the one gearset is positioned above the other gearset such that the second sprocket 50 is next to the top sprocket 51. The first sprocket 49 is adapted to the input shaft 55, the bottom sprocket 52 is adapted to the output shaft 56, and the second sprocket 50 is adapted to the top sprocket 51 with the connector shaft 57. Each sprocket/shaft adaptation acts as a single unit, each unit is rotationally affixed to the inside of the gearbox and is able to rotationally interact. The rotational interaction refers to the intermeshing among the sprockets and chains such that steering input is transmitted internally from the first sprocket 49/input shaft 55 unit to the second sprocket 50/top sprocket 51/connector shaft 57 unit, then from the second sprocket 50/top sprocket 51/connector shaft 57 unit to the bottom sprocket 52/output shaft 56 unit; and (2) the external components include the input and output shafts 55 and 56, each shaft protrudes out of and occupies the same side of the gearbox, respectively.

Referring to FIGS. 9, 12, and 13, there is a close up illustration of the bellcrank/tie rod steering system interactively operating with the front suspension system. The chain and sprocket assembly 13 is secured to the firewall 12 in a manner such that the first sprocket/input shaft unit is located inside the cab behind the driver side dash (not shown), the second sprocket/top sprocket/connector shaft unit is located inside the cab behind the passenger side dash (not shown), and the bottom sprocket/output shaft unit is located outside the cab below the passenger side firewall. This way, the input shaft is directed backwards towards the steering wheel (not shown) and is pivotally connected to the end of the steering column 15 while the output shaft is directed backwards towards the steering box 14 and is pivotally connected to the front end of the steering shaft 16. The back end of the steering shaft 16 is pivotally connected to the input shaft of the steering box 14. The chain and sprocket assembly 13 cooperates with the steering shaft 16 to transmit steering input from the steering column 15 to the steering box 14. The steering box 14 is attached to the passenger frame side behind the output shaft of the chain and sprocket assembly 13, beneath the passenger side floorboard (not shown), and next to the transmission cross-member 11.

The output shaft of the steering box 14 is a sector shaft, the sector shaft being rotationally attached to the pitman arm 17. The first draglink 20 extends from the pitman arm 17 forward to the bellcrank 18 such that the one end is pivotally connected to the pitman arm 17 while the other end is pivotally connected to the trailing arm of the bellcrank 18. The one and other ends of the first draglink 20 are substantially coincident with the frame and axle ends of the front passenger lower link 26, respectively. The first draglink 20 transmits steering input from the steering box 14 to the bellcrank 18. The combined effects of the coincident alignment between the first draglink 20 and front passenger lower link 26 and the isolation of the bellcrank 18 from the lateral rotation of the front axle 24 result in negligible relative motion between the pitman arm 17 and bellcrank 18 as the front axle 24 moves up and down throughout suspension travel. The negligible relative motion between the pitman arm 17 and bellcrank 18 serves to minimize bumpsteer as the front axle 24 moves up and down throughout suspension travel.

Referring to FIG. 9: Lying parallel to the front axle 24, the second draglink 21 extends from the bellcrank 18 to the lever arm 19 such that the one end is pivotally connected to the leading arm of the bellcrank 18 while the other end is pivotally connected to the mid-point of the lever arm 19, the second draglink 21 serving to transmit steering input from the bellcrank 18 to the lever arm 19.

In addition to the mid-point, the lever arm 19 has pivot and swing ends whereby the pivot end is rotationally attached to the floor of the truss 29 while the swing end is pivotally connected to the driver and passenger tie rods 22 and 23. By being attached to the truss 29 which in turn is attached to the front axle 24, the lever arm 19 is subject to the lateral rotation of the front axle 24 during suspension travel. Also lying parallel to the front axle 24 are the driver and passenger tie rods 22 and 23 which extend from the swing end of the lever arm 19 to the driver and passenger steering knuckles 41 and 42 such that the one ends are pivotally connected to the swing end of the lever arm 19 while the other ends are pivotally connected to the steering arms of the driver and passenger steering knuckles 41 and 42, the driver and passenger tie rods 22 and 23 serving to transmit steering input from the lever arm 19 to the driver and passenger steering knuckles 41 and 42, respectively. Since the lever arm 19 and steering knuckles 41 and 42 are attached directly to the front axle 24, there is no relative motion between the lever arm 19 and steering knuckles 41 and 42 as the front axle 24 moves up and down throughout suspension travel.

Referring to FIGS. 12 and 13: Lying parallel to the front axle 24, the second draglink 21 extends from the bellcrank 18 to the driver steering knuckle 41 such that the one end is pivotally connected to the leading arm of the bellcrank 18 while the other end is pivotally connected to the steering arm of the driver steering knuckle 41, the second draglink 21 serving to transmit steering input from the bellcrank 18 to the driver steering knuckle 41. Also lying parallel to the front axle 24 is the crossover tie rod 46 which extends from the driver steering knuckle 41 to the passenger steering knuckle 42 such that the one end is pivotally connected to the steering arm of the driver steering knuckle 41 while the other end is pivotally connected to the steering arm of the passenger steering knuckle 42, the crossover tie rod 46 serving to transmit steering input from the driver steering knuckle 41 to the passenger steering knuckle 42.

Since the bellcrank 18 and lever arm 19/driver steering knuckle 41 are isolated from and subject to the lateral rotation of the front axle 24 and since one and the other ends of the second draglink 21 are connected to the bellcrank 18 and lever arm 19/driver steering knuckle 41, respectively, then the other end of the second draglink 21 undergoes an angular displacement due to the lateral rotation of the front axle 24 during suspension travel. The angular displacement of the other end of the second draglink 21 becomes apparent only when the suspension approaches the limits of compression, and can be made irrelevant be controlling suspension travel particularly compression, this irrelevance serves to minimize the relative motion between the bellcrank 18 and lever arm 19/driver steering knuckle 41 as the front axle 24 moves up and down throughout suspension travel. The minimal, if any, relative motions between the bellcrank 18 and lever arm 19/driver steering knuckle 41 and between the driver and passenger steering knuckles 41 and 42 cooperatively serve to minimize bumpsteer as the front axle 24 moves up and down throughout suspension travel.

Referring to FIGS. 14 and 15, there are close up illustrations of the rack and pinion steering system interactively operating with the front suspension system. Secured to the firewall 12 as discussed earlier is the chain and sprocket assembly 13, the assembly 13 having input and output shafts such that the input shaft is directed backwards towards the steering wheel and is pivotally connected to the end of the steering column 15 while the output shaft is directed forwards towards the front of the vehicle and is pivotally connected to the one end of the steering shaft 16. The other end of the steering shaft 16 is pivotally connected to the pinion shaft of the rack and pinion steering box 47, the steering box 47 being located on the front axle 24. The chain and sprocket assembly 13 cooperates with the steering shaft 16 to transmit steering input from the steering column 15 to the rack and pinion steering box 47, the telescoping feature allowing the steering shaft 16 to maintain compliant length as the front axle 24 moves up or down during suspension travel. Equipped with a tie rod bar, the rack and pinion steering box 47 is attached to the top of the front axle 24 between the truss 29 and passenger lower shock mounting bracket 44, thereby positioning the tie rod bar in front of the front axle 24. The draglink 48 lies parallel to the front axle 24 and extends from the rack and pinion steering box 47 to the driver steering knuckle 41, the one end being pivotally connected to the midpoint of the tie rod bar while the other end is pivotally connected to the steering arm of the driver steering knuckle 41, the draglink 48 serving to transmit steering input from the rack and pinion steering box 47 to the driver steering knuckle 41. Also lying parallel to the front axle 24 is the crossover tie rod 46 which extends from the driver steering knuckle 41 to the passenger steering knuckle 42 such that the one end is pivotally connected to the steering arm of the driver steering knuckle 41 while the other end is pivotally connected to the steering arm of the passenger steering knuckle 42, the crossover tie rod 46 serving to transmit steering input from the driver steering knuckle 41 to the passenger steering knuckle 42.

During articulation or one wheel suspension travel, the front axle 24 rotates about a line parallel to the longitudinal axis, this rotation serving to likewise rotate the rack and pinion steering box 47. The rotation of the rack and pinion steering box 47 during articulation or one wheel suspension travel will cause the rack (not shown) to slide thereby moving the draglink 48 which acts to turn the steering knuckles 41 and 42 even though the steering wheel is not turned. The amount that the rack slides can be reduced with a small gear (not shown) on the pinion, i.e., with a slow-ratio gearset (not shown) in the rack and pinion steering box 47. By utilizing a quick-ratio gearset (not shown) in the chain and sprocket assembly 13 in combination with the slow-ratio gearset in the rack and pinion steering box 47, the relatively quick operation of the chain and sprocket assembly 13 will counteract the relatively slow operation of the rack and pinion steering box 47 thereby maintaining crisp steering response while at the same time minimizing the incidence of bumpsteer during articulation or one wheel suspension travel.

Referring to FIGS. 10 and 11, there are illustrations of the bellcrank/tie rod steering system and front and rear suspension systems, in this case emphasizing the front suspension system:

The front differential housing is attached to the axle tubes in a manner such that the front differential housing is offset from the center of the front axle 24 the housing being located closer to the driver frame side than to the passenger frame side. Then the truss 29 is attached to the center of the front axle 24. Axle brackets 30 are attached to the top of the truss 29 the attachment locating the axle brackets 30 at the center of the front axle 24. Frame brackets 31 are attached to the front end of the frame 10 next to the driver and passenger frame sides. Axle brackets 32 are attached to the front axle 24 near the ends of the axle tubes. Frame brackets 33 are attached to the middle of the transmission cross-member 11.

Each upper link 25 has inner and outer ends that are attached to flexible joints, the flexible joint at the inner end is pivotally connected to the axle bracket 30 while that at the outer end is pivotally connected to the frame bracket 31, the pivotable connections result in the upper links being positioned above and in front of the front axle 24 with a diagonal geometry thereby centrally locating the front axle 24 beneath the vehicle throughout suspension travel and obviating the need for a lateral stabilizing device. Each lower link 26 has inner and outer ends that are attached to flexible joints the flexible joint at the inner end is pivotally connected to the frame bracket 33 while that at the outer end is pivotally connected to the axle bracket 32, the pivotable connections result in the lower links 26 being positioned behind the front axle 24 with a diagonal geometry thereby reducing the effects of roll steer. The flexible joints that are attached to the outer ends of the lower links 26 refer to the front driver and passenger lower link axle joints 27 and 28, respectively.

Frame brackets 31 and 33 each have selectable connection locations such that selecting another connection location varies the load transfer distribution to the frame 10 and allows the front suspension to be tuned for specific characteristics.

Referring to FIGS. 10 and 11, there are illustrations of the bellcrank/tie rod steering system and front and rear suspension systems, in this case emphasizing the rear suspension system:

The rear differential housing is attached to the axle tubes in a manner such that the rear differential housing is located at the center of the rear axle 34. Axle brackets 37 are affixed to the top of the rear differential housing the attachment locating the axle brackets 37 at the center of the rear axle 34. Frame brackets 38 are attached to the rear end of the frame 10 next to the driver and passenger frame sides. Axle brackets 39 are attached to the rear axle 34 near the ends of the axle tubes. Frame brackets 40 are attached to the middle of the transmission cross-member 11.

Each upper link 35 has inner and outer ends that are attached to flexible joints, the flexible joint at the inner end is pivotally connected to the axle bracket 37 while that at the outer end is pivotally connected to the frame bracket 38, the pivotable connections result in the upper links 35 being positioned above and behind the rear axle 34 with a diagonal geometry thereby centrally locating the rear axle 34 beneath the vehicle throughout suspension travel and obviating the need for a lateral stabilizing device. Each lower link 36 has inner and outer ends that are attached to flexible joints the flexible joint at the inner end is pivotally connected to the frame bracket 40 while that at the outer end is pivotally connected to the axle bracket 39, the pivotable connections result in the lower links 36 being positioned in front of the rear axle 34 with a diagonal geometry thereby reducing the effects of roll steer.

Frame brackets 38 and 40 each have selectable connection locations such that selecting another connection location varies the load transfer distribution to the frame 10 and allows the rear suspension to be tuned for specific characteristics.

Referring to FIGS. 21 and 22, there are illustrations of the front and rear axles, respectively. The figures show the components of each axle, including the front and rear differential housings 70 and 71 and axle tubes 72. Features unique to the front axle 24 include: the differential housing 70 being offset from the center of the axle 24 and closer to the driver frame side than to the passenger frame side in order to align the pinion shaft (not shown) with the first output shaft of the transfer case (not shown); the truss 29 has a top 64 and floor 65 whereby the truss 29 is attached to the center of the axle 24 in a manner such that the top 64 locates the mounting brackets 30 while the floor 65 locates the lever arm 19 (not shown in FIG. 21 or 22) at the center of the front axle. Features unique to the rear axle 34 include the availability that the mounting brackets 37 are an integral part of the top of the differential housing 71, the housing 71 being a casting in a manner analogous to that well-known in the art.

Referring to FIGS. 23 and 24, there are illustrations of the steering system interactively operating with the front suspension system, in this case emphasizing the front suspension system at ride height and articulated, respectively. Particularly the figures reveal the relative change in position of the upper links 25 with that of the lower links 26 as the front suspension changes from ride height to being fully articulated—specifically the relatively small change in position of the upper links 25 compared to the relatively large change in position of the lower links 26.

Referring to FIGS. 25-27, there are illustrations of the bellcrank/tie rod steering system and front and rear suspension systems, in this case emphasizing the flexible joints utilized in the steering and suspension systems:

Referring to FIGS. 25 and 26, the flexible joints utilized in the steering system include U-joints 66 and ball joints 67. A U-joint 66 pivotally connects: the input shaft of the chain and sprocket assembly 13 to the steering column 15, the output shaft of the chain and sprocket assembly 13 to the front end of the steering shaft 16, and the back end of the steering shaft 16 to the input shaft of the steering box 14. A ball joint 67 pivotally connects: the one end of the first draglink 20 to the pitman arm 17, the other end of the first draglink 20 to the trailing arm of the bellcrank 18, the one end of the second draglink 21 to the leading arm of the bellcrank 18, and the other end of the second draglink 21 either to the mid-point of the lever arm 19 or to the steering arm of the driver steering knuckle 41. A ball joint 67 pivotally connects: the one ends of the driver and passenger tie rods 22 and 23 to the swing end of the lever arm 19, the other ends of the driver and passenger tie rods 22 and 23 to the steering arms of the driver and passenger steering knuckles 41 and 42, the one end of the crossover tie rod 46 to the steering arm of the driver steering knuckle 41, and the other end of the crossover tie rod 46 to the steering arm of the passenger steering knuckle 42, respectively.

Referring to FIG. 27, the flexible joints utilized in the front and rear suspension systems include spherical rod ends, cartridge-style joints, and the driver and passenger lower link axle joints 27 and 28. Flexible joints 68 pivotally connect: the inner ends of the front upper links 25 to the axle brackets 30, the inner ends of the front lower links 26 to the frame brackets 33, the inner ends of the rear upper links 35 to the axle brackets 37, and the inner ends of the rear lower links 36 to the frame brackets 40. Flexible joints 69 pivotally connect: the outer ends of the front upper links 25 to the frame brackets 31, the outer ends of the rear upper links 35 to the frame brackets 38, and the outer ends of the rear lower links 36 to the axle brackets 39. The driver and passenger lower link axle joints 27 and 28 pivotally connect the outer ends of the front driver and passenger lower links 26 to the axle brackets 32, respectively.

While the invention has been illustrated and described as embodied in a vehicle steering and suspension system, it is not intended to be limited to the details shown, since it will be understood that various omissions, modifications, substitutions and changes in the forms and details of the device illustrated and in its operation can be made by those skilled on the art without departing in any way from the scope and spirit of the present invention.

What is claimed is:

1. A steering and front and rear suspension systems for a vehicle having a frame suspended above solid axles, the steering and front or rear suspension systems comprising:
   a steering box, the box having input and output shafts;
   a steering shaft, the shaft having a front and back ends;
   a bellcrank, the bellcrank having leading and trailing arms;
   a lever arm, the lever arm having a mid-point, and pivot and swing ends;
   first and second draglinks, each draglink having a first and second ends;
   front driver and passenger lower link axle joints;
   a chain and sprocket assembly, the assembly having input and output shafts;
   a tie rod, the tie rod refers either to driver and passenger tie rods or to a crossover tie rod, each tie rod having a first and second ends;
   a pair of upper links;
   a pair of lower links;
   front or rear solid axle, each axle having a differential housing and two axle tubes;
   a truss, the truss having a top and floor;
   wherein the frame comprises a driver frame side, a passenger frame side, and a transmission cross-member, the frame and each frame side having a front and rear ends;
   wherein each pair of upper or lower links refers to driver and passenger upper or lower links thereby being located at the driver and passenger sides of the frame, respectively; wherein the pairs of upper and lower links are included in the front or rear suspension system;

wherein the front or rear differential housing is attached to the axle tubes in a manner such that the front differential housing is offset from a center of the front axle the housing being located closer to the driver frame side than to the passenger frame side while the rear differential housing is located at a center of the rear axle;

wherein the truss is attached partway to the front differential housing and partway to one of the front axle tubes in a manner such that the truss is located at the center of the front axle;

wherein all pivotal connections are made with flexible joints.

2. The steering and front or rear suspension systems of claim 1, wherein the front driver and passenger lower link axle joints serve as flexible joints for an axle ends of the driver and passenger lower links in the front suspension system, respectively, the passenger axle joint also serving as a mounting point for the bellcrank;

wherein the axle joint is comprised of horizontal and vertical shafts and a metal plate the horizontal shaft is rotationally affixed to one edge of the plate and the vertical shaft is rotationally affixed to another edge of the plate, the horizontal shaft serves to rotationally attach the axle joint to the front axle while the vertical shaft serves to rotationally attach the axle joint to the axle end of the front lower link, the combined effect of the horizontal and vertical shafts being rotationally attached to the front axle and front lower link, respectively, serves to pivotally connect the front axle to the front lower link; wherein the metal plate for the passenger axle joint bears a post that rotationally secures the bellcrank to the passenger axle joint.

3. The steering and front or rear suspension systems of claim 1, wherein the chain and sprocket assembly is a gearbox that is comprised of both internal and external components;

wherein the internal components include one and the other gearsets, an input shaft, an output shaft, and a connector shaft, each gearset is comprised of one chain and two sprockets, each chain has links while each sprocket has teeth; wherein the two sprockets and chain in one gearset are the first and second sprockets and one chain while the two sprockets and chain in the other gearset are the top and bottom sprockets and other chain, respectively; wherein the two sprockets in each gearset are spatially separated from each other, yet indirectly connected to each other via a common association with the chain, the common association refers to the teeth on the first and second sprockets being able to intermesh with the links on the one chain and the teeth on the top and bottom sprockets being able to intermesh with the links on the other chain; wherein the one gearset is oriented horizontally while the other is oriented vertically, the one gearset is positioned above the other gearset such that the second sprocket is next to the top sprocket; wherein the first sprocket is adapted to the input shaft, the bottom sprocket is adapted to the output shaft, and the second sprocket is adapted to the top sprocket with the connector shaft; wherein each sprocket/shaft adaptation acts as a single unit, each unit is rotationally affixed to the inside of the gearbox and is able to rotationally interact; wherein the rotational interaction refers to the intermeshing among the sprockets and chains such that steering input is transmitted internally from the first sprocket/input shaft unit to the second sprocket/top sprocket/connector shaft unit, then from the second sprocket/top sprocket/connector shaft unit to the bottom sprocket/output shaft unit;

wherein the external components include the input and output shafts such that each shaft protrudes out of and occupies the same side of the gearbox.

4. The steering and front or rear suspension systems of claim 1, wherein the chain and sprocket assembly is secured to a firewall in a manner such that the input and output shafts are directed backwards towards the rear of the vehicle, the input shaft is located inside a cab of the vehicle—behind a driver side dash and is pivotally connected to a steering column while the output shaft is located outside the cab below a passenger side firewall and is pivotally connected to the front end of the steering shaft; wherein the back end of the steering shaft is pivotally connected to the input shaft of the steering box, the chain and sprocket assembly cooperating with the steering shaft to transmit steering input from the steering column to the steering box;

wherein the steering box is attached to the passenger frame side behind the output shaft of the chain and sprocket assembly, beneath a passenger side floor board, and next to the transmission cross-member; wherein the output shaft of the steering box is rotationally attached to a pitman arm;

wherein the first draglink extends forward from the pitman arm to the bellcrank such that the first end is pivotally connected to the pitman arm while the second end is pivotally connected to the trailing arm of the bellcrank, the first and second ends are substantially coincident with a frame and the axle ends of the front passenger lower link, respectively, the connections by the first and second ends enabling steering input to be transmitted from the steering box to the bellcrank.

5. The steering and front or rear suspension systems of claim 1, wherein at least one second draglink lies parallel to the front axle and extends from the bellcrank to the lever arm such that the first end is pivotally connected to the leading arm of the bellcrank while the second end is pivotally connected to the mid-point of the lever arm, the connections by the first and second ends enabling steering input to be transmitted from the bellcrank to the lever arm;

wherein the lever arm has pivot and swing ends, the pivot end is rotationally connected to the floor of the truss while the swing end is pivotally connected to the driver and passenger tie rods; wherein the driver and passenger tie rods extend from the lever arm to a driver and passenger steering knuckles such that the first ends are pivotally connected to the lever arm while the second ends are pivotally connected to the driver and passenger steering knuckles, the connections by the first and second ends enabling steering input to be transmitted from the lever arm to the driver and passenger steering knuckles, respectively.

6. The steering and front or rear suspension systems of claim 1, wherein in the front or rear suspension system:

the pair of upper links extend from the front or rear axle to the front or rear end of the frame, each link has inner and outer ends that are attached to flexible joints, the flexible joints are pivotally connected to mounting brackets, the mounting brackets for the inner ends are attached to the top of the truss or rear differential housing while the mounting brackets for the outer ends are attached to the front or rear end of the frame next to their respective frame sides such that the inner ends of the links are closer to a vehicle centerline than the outer ends of the links; wherein the mounting brackets that are attached to the top of the truss or rear differential housing are located at the center of the front or rear axle, respectively;

the pair of lower links extend from the front or rear axle to the transmission cross-member, each link has inner and outer ends that are attached to flexible joints, the flexible joints are pivotally connected to mounting brackets, the mounting brackets for the inner ends are attached to the transmission cross-member while the mounting brackets for the outer ends are attached to the front or rear axle next to an ends of the axle tubes such that the inner ends of the links are closer to the vehicle centerline than the outer ends of the links respectively; wherein the outer ends of the pair of front lower links refer to the axle ends of the front driver and passenger lower links such that the flexible joints that are attached to the outer ends refer to the front driver and passenger lower link axle joints, respectively.

7. The steering and front or rear suspension systems of claim 1, wherein at least one second draglink lies parallel to the front axle and extends from the bellcrank to the driver steering knuckle such that the first end is pivotally connected to the leading arm of the bellcrank while the second end is pivotally connected to the driver steering knuckle, the connections by the first and second ends enabling steering input to be transmitted from the bellcrank to the driver steering knuckle;

wherein the crossover tie rod extends from the driver steering knuckle to the passenger steering knuckle such that the first end is pivotally connected to the driver steering knuckle and the second end is pivotally connected to the passenger steering knuckle, the connections by the first and second ends enabling steering input to be transmitted from the driver steering knuckle to the passenger steering knuckle.

\* \* \* \* \*